(12) United States Patent
Ojard

(10) Patent No.: US 7,894,323 B2
(45) Date of Patent: *Feb. 22, 2011

(54) HOME PHONE LINE NETWORKING ENHANCEMENTS FOR MULTIPLE DWELLING UNIT ENVIRONMENTS

(75) Inventor: Eric J. Ojard, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 12/497,481

(22) Filed: Jul. 2, 2009

(65) Prior Publication Data

US 2010/0008213 A1 Jan. 14, 2010

Related U.S. Application Data

(63) Continuation of application No. 10/435,778, filed on May 12, 2003, now Pat. No. 7,580,344.

(60) Provisional application No. 60/381,209, filed on May 17, 2002.

(51) Int. Cl.
*H04J 1/12* (2006.01)
(52) U.S. Cl. .................. 370/201; 370/280; 370/282; 370/296; 370/468; 379/88.08; 379/395.01
(58) Field of Classification Search ............ 370/467, 370/280, 282, 296, 468; 379/88.08, 93.01
See application file for complete search history.

(56) References Cited

U.S. PATENT DOCUMENTS

| | | | |
|---|---|---|---|
| 5,875,054 A * | 2/1999 | Onoda et al. | 359/341.2 |
| 6,798,769 B1 * | 9/2004 | Farmwald | 370/352 |
| 6,988,212 B1 * | 1/2006 | Hamdi | 713/310 |
| 7,027,537 B1 * | 4/2006 | Cheong et al. | 375/348 |

* cited by examiner

*Primary Examiner*—Seema S Rao
*Assistant Examiner*—Sai-Ming Chan
(74) *Attorney, Agent, or Firm*—Garlick Harrison & Markison; Bruce E. Garlick

(57) ABSTRACT

A Home Phoneline system operating within a Multiple Dwelling Unit includes a Home Phoneline Access Multiplexer (HPAN) that services a plurality of Home Phoneline networks, each including at least one Home Phoneline station. The HPAN synchronizes upstream and downstream transmissions to eliminate Near-Far cross-talk. According to a second operation of the present invention, the HPAN manages the transmission power of the HomePNA stations of the HomePNA networks to reduce Near-Near and Far-Far cross-talk. To optimize throughput across the whole building, station power levels are adjusted based on their location in terms of amounts of attenuation. A third method of operation according to the present invention includes adjusting the receiver sensitivity of the Home Phoneline stations according to detected or characterized levels of cross-talk within the MDU.

19 Claims, 15 Drawing Sheets

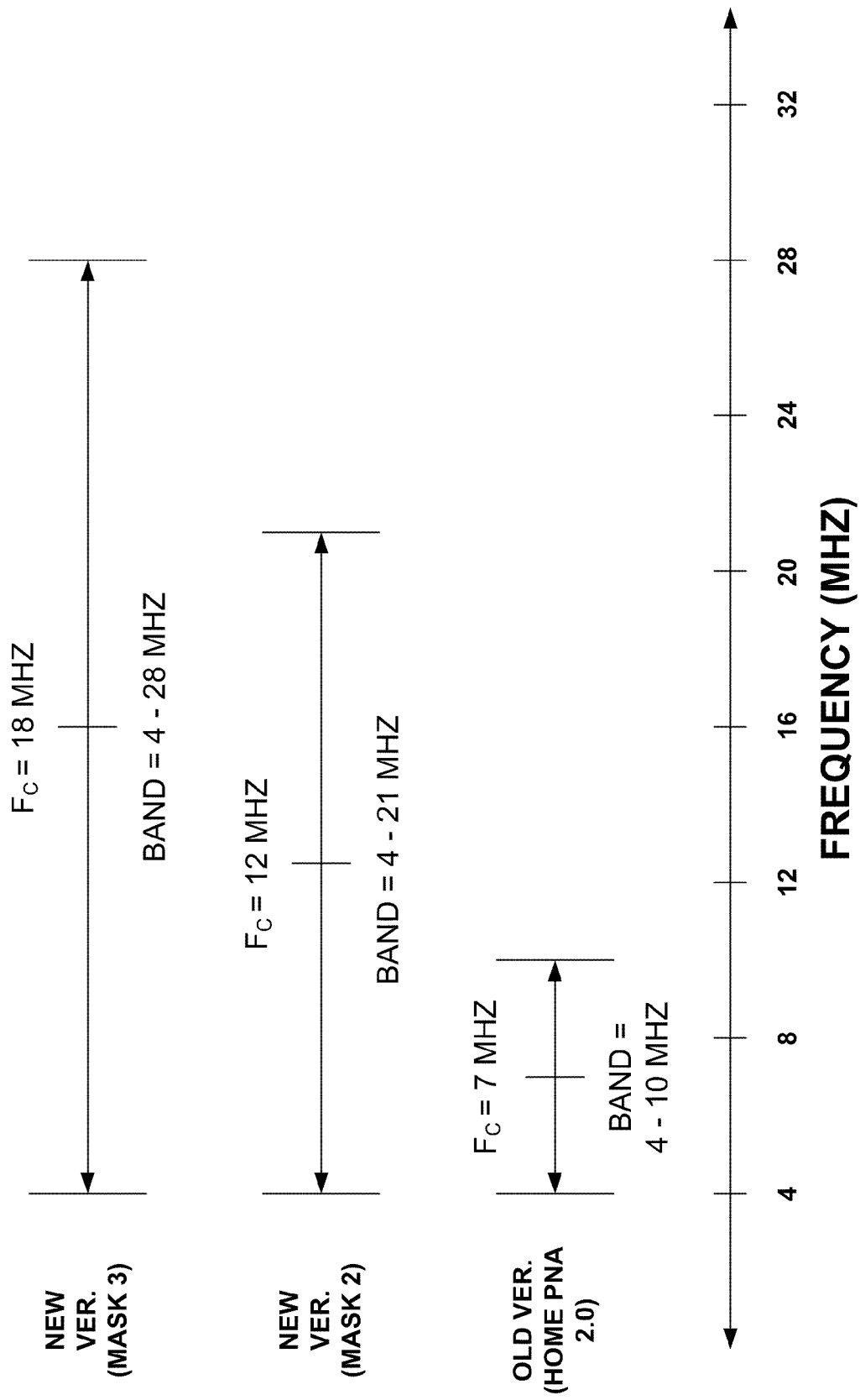

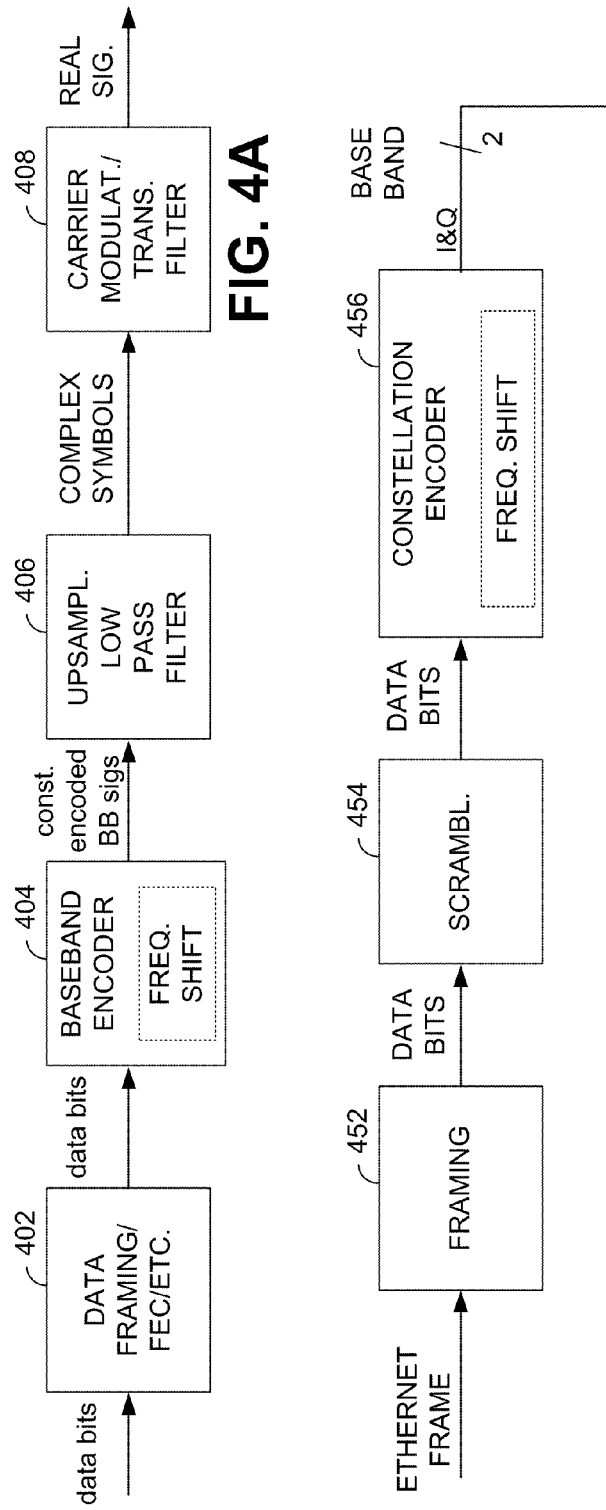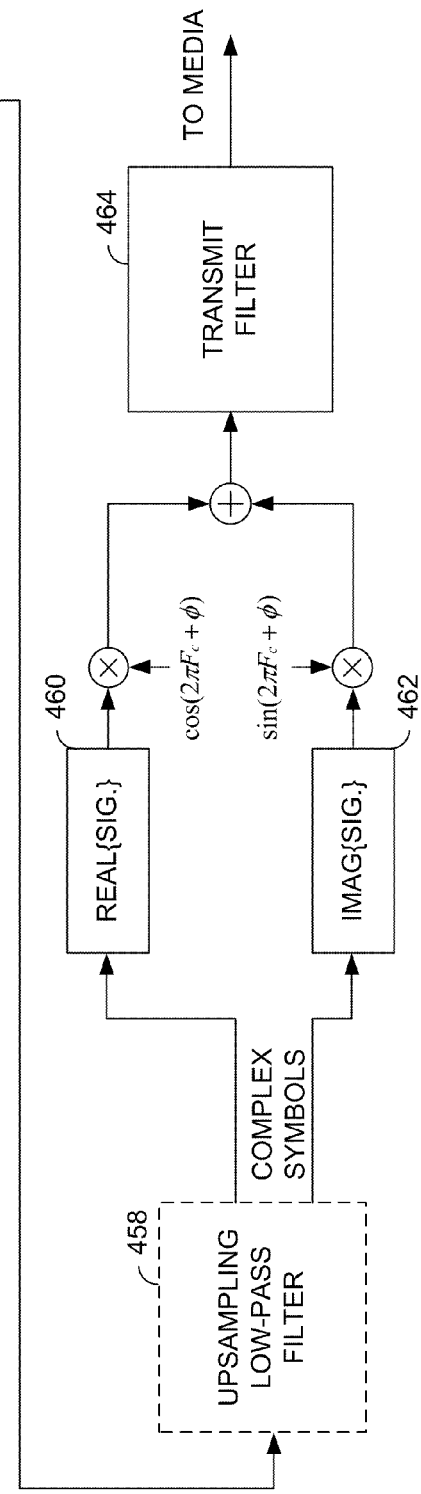

HOME PHONE LINE NETWORKING ENHANCEMENTS FOR MULTIPLE DWELLING UNIT ENVIRONMENTS

CROSS REFERENCE TO RELATED APPLICATION

The present U.S. Utility patent application claims priority pursuant to 35 U.S.C. §120, as a continuation, to U.S. Utility application Ser. No. 10/435,778, entitled "Home Phone Line Networking Enhancements for Multiple Dwelling Unit Environments," filed May 12, 2003, pending, which claims priority pursuant to 35 U.S.C. §119(e) to U.S. Provisional Patent Application Ser. No. 60/381,209, filed May 17, 2002, which are hereby incorporated herein by reference in their entirety and made part of the present U.S. Utility patent application for all purposes.

FIELD OF THE INVENTION

This invention relates generally to wired communications; and more particularly to wired home phone line packet data network communications.

BACKGROUND OF THE INVENTION

Packet data networks, their structure, and their operation are generally known. Examples of packet data networks include Local Area Networks (LANs), Wide Area Networks (WANs), and the Internet, among others. Packet data networks may be wired, wireless, or a combination of wired and wireless networks. Particular examples of networks include wired Ethernet LANs (IEEE 802.3 networks), wireless LANs (IEEE 802.11 networks), and Home Networks (HomePNA networks), among others. Each of these networks services data communications between groups of intercoupled network clients. As network client data exchange demands have increased, operating capabilities of these networks have also increased. For example, wired Ethernet LANs first serviced data communications at relatively low data throughput rates, e.g., 10 MBPS but now service data communications at relatively higher data rates, e.g., 100 MBPS, 1 GBPS, and higher. HomePNA networks have also evolved to support greater data rates with each HomePNA Specification revision.

The HomePNA Specification sets forth operations that, when implemented, allow a plurality of network devices to communicate with one another via premises telephone wiring, e.g., unshielded twisted pair (UTP) wiring. A currently existing version of the HomePNA Specification is known as the HomePNA 2.0 Specification. The HomePNA 2.0 Specification specifies a frequency band of 4-10 MHz, a carrier frequency of 7 MHz, preamble/header/trailer symbol rates of 2 MBaud, payload symbol rates of 2 and 4 MBaud, and constellations of between 2 and 8 bits/symbol. In a typical HomePNA network installation, a plurality of network devices, e.g., computers, share the premises telephone wiring with telephones and other devices that access the telephone network via the telephone wiring. Resultantly, the HomePNA 2.0 Specification supports data rates of up to 32 Mbps, at best.

The capabilities of the HomePNA 2.0 Specification, however, are not sufficient when servicing Multiple Dwelling Unit installations. Cross talk interference between HomePNA stations at best reduces serviced data rates and, at worst, prevents the HomePNA stations from operating.

Thus, there is a need in the art for enhancements in the operation of HomePNA devices that will allow the devices to adequately operate in a Multiple Dwelling Unit installation.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

FIG. 2 is a graph illustrating the frequency bands and carrier frequencies defined for the old and new version operations of Table 1;

FIG. 4A is a block diagram generally illustrating the components of a carrier-based transmitter that operates according to the present invention;

FIG. 4B is a block diagram illustrating in more detail the components of a carrier-based transmitter operating according to the present invention with particular applicability to a home networking installation;

DETAILED DESCRIPTION OF THE INVENTION

Figure 1:
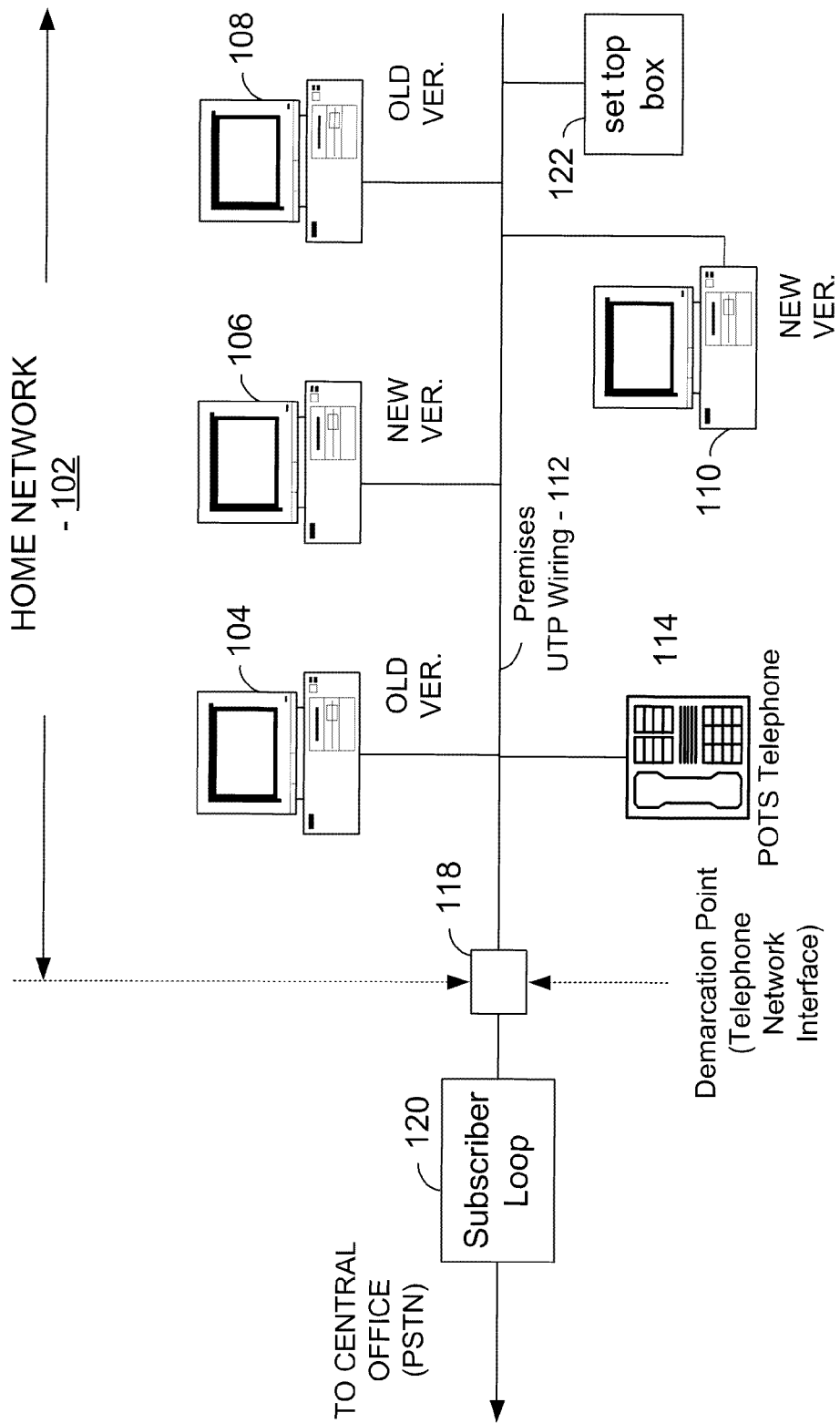
FIG. 1 is a system diagram illustrating a home data network that embodies the principles of the present invention.

In order to overcome the previously described shortcomings of packet data networks as well as additional shortcomings of the prior devices, a next generation Home Phoneline system constructed according to the present invention operates within a Multiple Dwelling Unit (MDU) installation to mitigate the affects of Near-End-Cross-Talk (NEXT) and Far-End-Cross-Talk (FEXT). More specifically, the invention operates to reduce (from a receiver's perspective) cross-talk from a near end interferer for a far end transmitter (referenced herein in a Near-Far cross-talk or NFXT), from a near end interferer for a near end transmitter (referenced herein in a Near-Near cross-talk or NNXT), and/or cross-talk from a far end interferer for a far end transmitter (referenced herein in a Far-Far cross-talk or FFXT). A MDU Home Phoneline system includes a Home Phoneline Access Multiplexer (HPAN) that services a plurality of Home Phoneline networks, each of which includes at least one Home Phoneline station. According to a first operation, the HPAN synchronizes upstream and downstream transmissions from and to a plurality of Home Phoneline stations of the plurality of Home Phoneline networks. Downstream refers to packets sent by the HPAN to stations within the dwelling units. Upstream refers to packets sent by stations within the dwelling units, regardless of the destination. The Master nodes of each HomePNA network, i.e., one of the HomePNA nodes in each HomePNA network, synchronizes the upstream and downstream transmissions of all HomePNA stations that are connected to a common binder to eliminate NEXT. More specifically, it eliminates NFXT, but not NNXT. One aspect of the present invention is that the Master node is located in the HPAN. This allows the Master nodes of the various networks to communicate with each other to facilitate synchronization of upstream and downstream transmissions as well as realizing other benefits. Hence, the approach as described above benefits MDU distribution, but not basic MDU functionality. In the described embodiment, the Master for each node is located within the HPAN.

According to a second operation of the present invention, the HPAN manages the transmission power of the HomePNA stations of the HomePNA networks. To optimize throughput across the whole building, stations should adjust their transmit power based on their location. For example, a station close to the binder, which causes a lot of cross-talk, would reduce its power relative to a station far from the binder. (Here, the word "close" and "far" indicate the amount of signal attenuation, not actual distance.) The HPAN can collect statistics about the signal strength from all HPNA stations, and based on this information, it can make decisions about the best transmit power levels for the building. The Master nodes of the HomePNA networks then instruct the slave nodes in their respective HomePNA networks to adjust their power accordingly. This mitigates FEXT and NNXT. This would benefit both MDU distribution and MDU basic functionality.

A third method of operation according to the present invention includes adjusting the receiver sensitivity of the Home Phoneline stations. The HPAN could instruct individual Home Phoneline stations to decrease their receiver sensitivity to prevent triggering on cross-talk, based on knowledge of cross-talk levels in the building. This would benefit MDU basic functionality. Other features and advantages of the present invention will become apparent from the following detailed description of the invention made with reference to the accompanying drawings.

FIG. 1 is a system diagram illustrating a home data network 102 that embodies the principles of the present invention. Home networking devices illustrated in FIG. 1 each support a single version of a plurality of versions of the HomePNA Specification. At the time of filing of this application, the HomePNA 2.0 Specification (Interface Specification for HomePNA 2.0.4 10M8 Technology (Version 0.8) date Jul. 17, 2001) was the most recent version of the HomePNA Specification. Computers 104 and 108 support an old version of the HomePNA standard, e.g., HomePNA 2.0, while computers 106 and 110 support a new version of the HomePNA Specification that may incorporate the teachings of the present invention, such new version designation not yet made. Hereinafter, references to an "old version" of the HomePNA Specification, "old version devices," or "old version operations" are generally made to devices and related operations that do not include the teachings of the present invention. Further, references to a "new version" of the HomePNA Specification, "new version devices," or "new version operations" are generally made to devices and related operations that include the teachings of the present invention. No other inferences or relationships regarding these references are to be drawn. These references are made merely to distinguish between those devices and operations that embody the teachings of the present invention and those devices and operations that do not.

Each of the computers 104-110 includes a network card and/or motherboard integrated circuits that support a respective version of the HomePNA Specification. Additionally, each of the computers 104-110 may also execute software instructions required for support of the respective a HomePNA Specification version. Operations according to the HomePNA 2.0 Specification are generally known and will only be described herein as they relate to the present invention.

The computers 104-110 communicate with one another via Unshielded Twisted Pair (UTP) wiring 112 located within a home network location 102. The UTP wiring 112 is generally referred to as "in-home telephone wiring." The UTP wiring 112 is shared with a Plain Old Telephone System (POTS) telephone 114 and a set top box 122. The UTP wiring 112 couples to the Public Switched Telephone Network (PSTN) via a PSTN subscriber loop 120. A demarcation point 118 interfaces the UTP wiring 112 to the subscriber loop 120. Via the UTP wiring 112 and the subscriber loop 120, the POTS telephone 114 and set top box 122 communicate with other devices across the PSTN. This construction and related operations are generally known and are not described further herein except as they relate to the present invention.

Table 1 describes some operational properties of old version operations and new version operations that may be implemented by computers 104 through 110 of FIG. 1. In Table 1, the old version is referred to as HomePNA 2.0 and the new versions are referred to as Mask 2 and Mask 3. Most description herein will relate particularly to Mask 2.

TABLE 1

NEW VERSION AND OLD VERSION PROPERTIES

|  | HomePNA 2.0 (old version) | Mask 2 (new version) | Mask 3 (new version) |
| --- | --- | --- | --- |
| Frequency Band | 4-10 MHz | 4-21 MHz | 4-28 MHz |
| Carrier Frequency | 7 MHz | 12 MHz | 18 MHz |
| Preamble/Header/Trailer symbol rate | 2 MHz | 2 MHz | 2 MHz |
| Payload Symbol Rate | 2, 4 MBaud | 2, 4, 8, 16 MBaud | 2, 6, 12, 24 MBaud |
| Constellation Sizes | 2-8 bits/symbol | 2-8 bits/symbol | 2-8 bits/symbol |

As is shown in Table 1, the old version employs a carrier frequency of 7 MHz and a frequency band of 4 MHz to 10 MHz. The Mask 2 new version employs a carrier frequency of 12 MHz and a frequency band of 4 MHz to 21 MHz. Finally, the Mask 3 new version employs a carrier frequency of 18 MHz and a frequency band of 4 MHz to 28 MHz. Thus, each of these versions has a different carrier frequency and frequency band. As is illustrated in Table 1, the maximum supported payload symbol rates of the versions varies. However, the constellation size (bits/symbol) remains consistent among the versions (2 to 8 bits/symbol). Further, the preamble/header/trailer symbol rate for each of the old and new versions is consistent (2 MHz). Commonality in frequency band, symbol rate, and constellation size between the old version operations and new version operations is employed with the present invention for inter-version compatibility operations.

FIG. 2 is a graph illustrating the frequency bands and carrier frequencies defined for the old and new version operations of Table 1. With particular reference to old version operations, the HomePNA 2.0 Specification defines a signal format occupying the 4 MHz to 10 MHz frequency band, with a peak data rate of 32 Mbps. To modulate the signal, the HomePNA 2.0 Specification uses Quadrature Amplitude Modulation (QAM) and Frequency-Diverse Quadrature Amplitude Modulation (FDQAM). The modulation type is rate-adaptive with symbols rates of 2 MHz and 4 MHz, constellations sizes of 2 to 8 bits/symbol, and a carrier frequency of 7 MHz. The multiple stations share access to the medium using a type of Carrier-Sense Multiple Access (CSMA), where only one station may transmit at a time.

FDQAM is described in U.S. Regular application Ser. No. 09/971,407, filed Oct. 5, 2001 by Eric J. Ojard, in U.S. Regular application Ser. No. 09/169,522, filed Oct. 9, 1998 by Eric J. Ojard (both of which are incorporated herein in their entirety), and in Appendix C of the HomePNA 2.0.4 Specification. FDQAM is a modulation type wherein the spectral bandwidth of the signal is at least twice the symbol rate of a modulated signal such that multiple spectral copies of the modulated signal exist within the spectral bandwidth. As FDQAM is implemented in HomePNA 2.0.4, each spectral region of the baseband modulated signal is represented by at least two spectral regions of the modulated signal, improving robustness in the presence of highly frequency-selective channels. In HomePNA 2.0, FDQAM applies to the 2 MHz symbol rate but not the 4 MHz symbol rate. With the present invention, a technique similar to FDQAM is employed to form a backwards-compatible signal format.

Next-generation (new version) applications, such as streaming video, will require higher data rates, on the order of 100 Mbps and beyond. To achieve the highest possible data rates with the highest degree of reliability, the new version signal format, e.g., mask 2 and mask 3, will naturally occupy a larger bandwidth. To meet market requirements, new version HomePNA devices must coexist with HomePNA 2.0 stations on the same network. Thus, on a network with both HomePNA 2.0 stations and next-generation devices, either type of signal may be present on the network at different points in time. To simplify the development and to minimize the cost of the hardware for a next-generation station, it is highly desirable that the new version signal format be such that the same new version receiver hardware can process either new version signals or old version signals without prior knowledge of which type of signal is present. It is also desirable to use the same new version transmitter structure for either type of signal. Thus, according to the present invention, both HomePNA 2.0 receivers and new version HomePNA receivers may coexist on the same network.

Figure 3A:
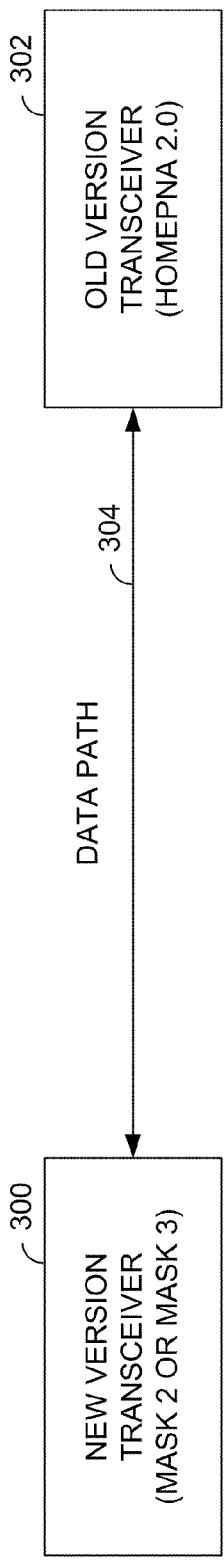
FIG. 3A is a block diagram illustrating generally how a new version device and an old version device interact according to the present invention.

FIG. 3A is a block diagram illustrating generally how a new version device and an old version device interact according to the present invention. As shown in FIG. 3A, an old version (HomePNA 2.0) transceiver 302 is able to communicate with a new version transceiver 300 (mask 2 or mask 3 of Table 1) via data path 304, e.g., the media 112 of FIG. 1. In particular, the new version device 300 transmits a new version signal that includes a component that appears, from the perspective of the old version device 302, to be an old version signal. The old version device 302 receives this component of the new version signal and, based upon information contained in a header portion of this component, determines whether it is the intended recipient for a respective payload of the corresponding data frame. If it is, the new version device 300 forms the payload so that the old version device 302 may receive it. In a transmission intended for a new version device, the new version device 300 forms the payload in a manner appropriate for receipt by another new version device. The old version device 302 simply ignores the payload.

Thus, in one operation, the old version device 302 receives the header, extracts data contained therein, determines that it is not the intended recipient, and ignores the corresponding payload (that is not compliant with the old version signal). In another operation, the new version device 300 sends a transmission intended for the old version device 302, indicating in the header that the transmission is intended for the old version device 302. In this operation, the old version device 302 receives the data contained in the payload.

For transmissions from the old version device 302 to the new version device 300, the old version device 302 transmits an old version signal. Using a same receiver structure that it uses for the receipt of both new version signals and old version signals, the new version device 300 receives the old version signal and extracts header information and payload contained in an old version signal data frame. With these receive operations, therefore, the old version signal also appears, from the perspective of the new version device to be a new version signal (at the corresponding symbol rate and constellation) transmitted over a channel that severely attenuates the higher frequencies.

Figure 3B:
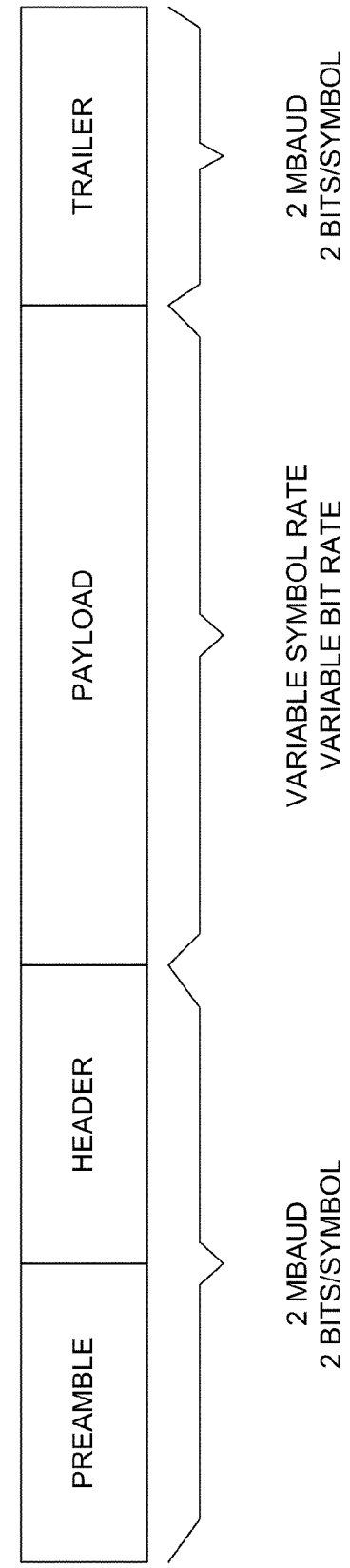
FIG. 3B is a block diagram illustrating the structure of a data frame constructed according to the present invention.

FIG. 3B is a block diagram illustrating the structure of a data frame constructed according to the present invention. As described in the HomePNA 2.0.4 specification, the data frame contains a preamble, a low-rate header, a variable high-rate payload, and a low-rate trailer, as shown in FIG. 3B. The preamble is a fixed sequence that provides for channel characterization, timing recovery, and equalizer training. The header indicates the modulation type of the payload, and it identifies the source and destination stations. The payload contains the data being transferred. The trailer provides a robust end-of-frame marker.

The duration of the data frames and the duration of each component of the data frames of the old version signal format and the new version signal format of FIG. 3B are consistent in some operations. From the perspective either of a new version device or of an old version device, the preamble, header, and trailer portions of the data frame of a new version signal and an old version signal are sufficiently similar to be sensed by new as well as old version devices, though they differ in frequency-dependent power spectral density and in phase. In some operations, the payload of a new version signal and an old version signal are also indistinguishable from the perspective either of a new version device or of an old version device.

Both the new version signal data frame and the old version signal data frame will include, a preamble, a header, and a trailer having one or more spectral copies of a baseband modulated signal with a 2 MBaud symbol rate and a 2 bits/symbol constellation. As will be recalled from Table 1, the baud rate and constellation of the HomePNA 2.0 Specification and the new version signal(s) are consistent.

However, the payload of a new version signal will be incompatible with old version devices in some operations. As was indicated in Table 1, the payload symbol rates supported by the HomePNA 2.0 Specification were 2 and 4 MBaud with constellations of between 2 and 8 bits/symbol. For Mask 2, the payload is transmitted at a symbol rate of between 2 and 16 MBaud with a constellation of between 2 and 8 bits/symbol. Finally, for Mask 3, the payload is transmitted at symbol rate of between 2 MBaud and 24 MBaud with a constellation of between 2 and 8 bits/symbol. Thus, the baud rates and constellation sizes of the preambles, headers, and trailers are consistent between the old version and new versions (from the perspective of each spectral copy of the baseband modulated signal). However, the payloads of the old version signal and new version signals are fully compatible for some symbol rates and constellation sizes but are incompatible for other symbol rates and constellation sizes.

Referring again to FIG. 3A, a new version device 300 includes a transmitter structure that produces a backwards-compatible new version signal that may be received by an old version device 302. The new version device 300 also includes a receiver structure that receives both new version signals and old version signals. According to the present invention, the new version device 300 operates within a new version frequency band, e.g., Mask 2 or Mask 3, while the old version device 302 operate within a old version frequency band, e.g., HomePNA 2.0 Specification.

To address the inherent incompatibility between the new version device 300 and the old version device 302, a new version signal includes a spectral component that appears, from the perspective of an old version device, to be an old version signal. Using this spectral component of the new version signal, a new version device 300 transmits control information and data to the old version device. According to one structure of the new version signal, the new version signal includes a plurality of identical spectral copies of a baseband modulated signal that reside within the new version frequency band. One (or multiple) of these spectral copies of the baseband modulated signal also resides within the old version frequency band and is/are indistinguishable from the old version signal. Moreover, a new version signal is characterized by a sloping power spectral density in a manner that provides sufficient power to enable an old version device to sense a new version signal and to successfully receive and interpret a new version signal header and preamble, as is described in greater detail below in the text for FIG. 19 and FIG. 20, among other places.

Likewise, the old version signal, when operated upon by a new version device 300, is indistinguishable from a new version signal (at corresponding symbol rates) with some spectral regions severely attenuated. Thus, the new version signal also supports the transmission of control information and data from old version devices to new version devices. According to one aspect of the present invention, the old version signal includes a spectral copy of a baseband modulated signal that resides within the old version frequency band. This spectral copy of the baseband modulated signal also resides within the new version frequency band and, when operated upon by the new version device, is indistinguishable from the new version signal. The old version signal may include multiple spectral copies of the baseband modulated signal within both the new and old version frequency bands. In such case, the new version device optimally combines these spectral copies of the baseband modulated signal.

In one embodiment of the new version signal, all preamble, header, and trailer portions of a new version signal include a component (one of a plurality of spectral copies of a baseband modulated signal) that is indistinguishable from an old version signal. When a new version device 300 transmits data to another new version device, the payload portion of the new version signal may be incompatible with the old version device. Based upon the contents of the header, however, an old version device 302 determines that the payload is not for it intended and ignores the payload.

The new version signal of the present invention may include a frequency-shifted portion and a non frequency-shifted portion. In such case, the frequency-shifted portion includes a plurality of spectral copies of a frequency shifted baseband modulated signal that are transmitted within the new version frequency band. One (or more) of these spectral copies of the baseband modulated signal is indistinguishable from an old version signal. Frequency shifting is performed so that at least one spectral copy of the baseband modulated signal is correctly formed within the old version frequency band so that it is indistinguishable from an old version signal. In this embodiment, absent the frequency shifting operations, the new version signal would be incompatible with old version devices. With this embodiment, non-payload portions of the new version signal, i.e., preamble, header and trailer, are shifted in frequency for all operations. However, payload portions of the new version signal are frequency shifted only when intended for old version devices (or when transmitting at a symbol rate consistent with old version devices).

With one particular embodiment described with reference to FIGS. 5A and 6A-6C, a one MHz frequency shift is required. With the baseband modulated signal having a baud rate of 2 MHz, inversion of every other symbol of the appropriate portions of the baseband modulated signal frequency shifts those portions of the baseband modulated signal by 1 MHz in frequency. After up sampling, modulation, and transmit filtering at the new version carrier frequency (12 MHz), a spectral copy of a baseband modulated signal carrying the preamble, header, and trailer portions of the data frame (of FIG. 3B) is created at the carrier frequency of the old version device 302. In a non-carrier based modulation scheme, the spectral copy of the baseband modulated signal is produced within the appropriate frequency band and at a desired center frequency. This spectral copy of the baseband modulated signal carrying the preamble, header, and trailer portions of the data frame at the carrier frequency of the old version device is indistinguishable from an old version signal.

Figure 5A:
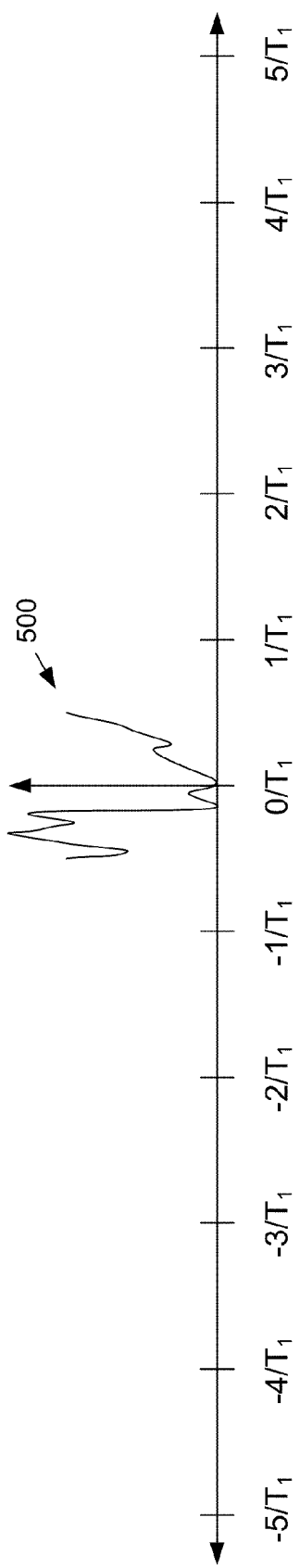
FIG. 5A is a graph illustrating the power spectral density of a baseband modulated signal carrying a preamble and header that is formed according to the present invention.

FIG. 4A is a block diagram generally illustrating the components of a carrier-based transmitter that operates according to the present invention. In this structure, data bits are received by one or more operations 402 that perform data framing, coding, and other preprocessing operations. After these operations 402, data bits are output that are framed, encoded, and otherwise processed for transmission. These encoded and framed data bits are received by a baseband encoder 404, which encodes the data bits into a baseband modulated signal. The power spectral density of a baseband modulated signal carrying the preamble and header is illustrated in FIG. 5A. An up sampling low pass filter 406 up samples and low pass filters the baseband modulated signal. Resultantly, a signal is produced that includes a plurality of spectral copies of the baseband modulated signal. Each spectral copy of the baseband modulated signal resides within a respective frequency band and at a respective center frequency. A carrier modulation block/transmit filtering block 408 receives the plurality of spectral copies of the baseband modulated signal and modulates them onto a carrier to create a real signal that is coupled to a media, e.g., UTP wiring 112 of FIG. 1.

The baseband modulated signal produced by the baseband modulator 404 may also be frequency shifted by the baseband modulator 404. The baseband modulated signal is frequency shifted in some operations so that a spectral copy of the baseband modulated signal will exist within a desired frequency band and with an appropriate center frequency so that it corresponds to an old version device. During formation of the payload, frequency shifting may or may not occur, based upon the characteristics of an intended device, i.e., a new version device or an old version device.

FIG. 4B is a block diagram illustrating in more detail the components of a carrier-based transmitter operating according to the present invention with particular applicability to a home networking installation. Data bits in an Ethernet frame are received by framing block 452. Framing block 452 performs framing operations on the data bits (here, of the Ethernet frame) and then provides its output to a scrambling block 454. The scrambling block 454 scrambles the frame that is received from framing block 452 and passes the scrambled frame as data bits to constellation encoder 456. The constellation encoder 456 creates the baseband modulated signal and frequency shifts the baseband modulated signal in some operations.

In one particular operation according to the present invention, the constellation encoder 456 frequency shifts portions of the baseband modulated signal corresponding to the preamble, header, and trailer of the data frame to create a frequency shifted baseband modulated signal. In one embodiment of these frequency-shifting operations, the constellation encoder 456 inverts every other symbol of the portions of the baseband modulated signal corresponding to the preamble, the header and the trailer. With a baseband modulated signal formed at 2 MBaud, by inverting every other symbol of these portions of the baseband modulated signal, the modified baseband modulated signal is shifted 1 MHz in frequency. The baseband modulated signal is received by up sampling low-pass filter 458 that up samples the baseband modulated signal and low pass filters the resultant signal. The resultant signal that includes a plurality of spectral copies of the baseband modulated signal.

FIG. 4B and all subsequent figures are described with particular reference to the Mask 2 example of Table 1. The reader will appreciate that the Mask 3 example of Table 1 could easily be applied by considering the differing characteristics of Mask 3 operations. The output of the up sampling low-pass filter 458 includes both real and imaginary components, e.g., I and Q components. These components are passed to an up-conversion block including a real part processing block 460 and an imaginary part processing block 462. The outputs of blocks 460 and 462 are modulated with corresponding I and Q components of the 12 MHz carrier. The I and Q carrier modulated components are summed and then transmit filtered at transmit filter block 464 to produce a new version signal for transmission. The new version signal is then coupled to a service media, e.g., UTP wiring 112 of FIG. 1.

FIG. 5A is a graph illustrating the power spectral density of a baseband modulated signal carrying a preamble and header that is formed according to the present invention. The particular power spectral density 500 of FIG. 5A is one that does not slope. Accordingly, for a system according to FIG. 5A, the total output power exceeds a total output power level for an old version signal or device. For systems in which a total output power level is to be maintained, a sloping power spectral density, as shown in FIG. 5A and as described herein, is utilized in one embodiment of the invention. The baseband modulated signal of FIG. 5A has a symbol rate of 2 MHz and a constellation that corresponds to the HomePNA 2.0 Specification. Thus, the power spectral density of the preamble and header portion of the baseband modulated signal has a 2 MHz bandwidth that corresponds to a 2 MBaud symbol rate. The power spectral density of the baseband modulated signal will vary from data frame to data frame based upon the contents of the header. However, the bandwidth of the baseband modulated preamble, header, and trailer portions of the baseband modulated signal will be 2 MHz for all 2 MBaud preambles/headers. A payload portion of the data frame will have similar characteristics when encoded at a symbol rate of 2 MBaud but will occupy a wider band when encoded at higher symbol rates. The description of FIGS. 5A through 6C will consider the power spectral density of the preamble and header portions of a corresponding data frame. However, this discussion applies to the trailer portion of the data frame as well and to the payload of the data frame when using a 2 MBaud symbol rate.

Figure 5B:
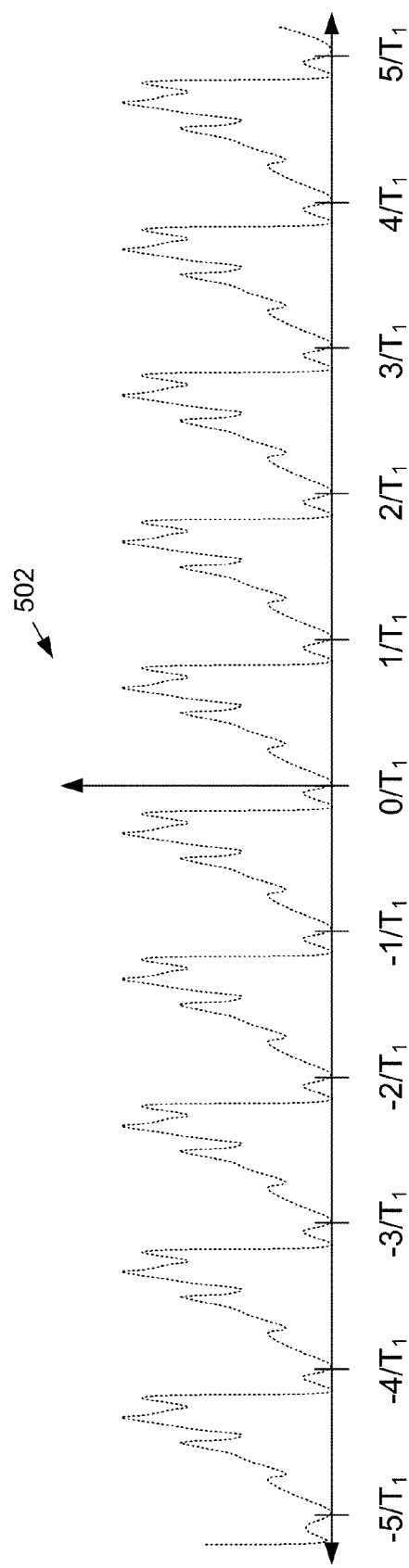
FIG. 5B is a graph illustrating the power spectral density of a plurality of spectral copies of the signal of FIG. 5A.

FIG. 5B is a graph illustrating the power spectral density of a plurality of spectral copies of the signal of FIG. 5A. The power spectral density 502 of FIG. 5B includes a plurality of spectral copies of the baseband modulated signal of FIG. 5A located adjacent one another and spread across the frequency spectrum. These spectral copies are aliases of the baseband modulated signal that are caused by the up sampling operations previously described. Each of these spectral copies of the baseband modulated signal has a bandwidth corresponding to the baseband modulated signal of FIG. 5A and has a respective center frequency.

Figure 6:
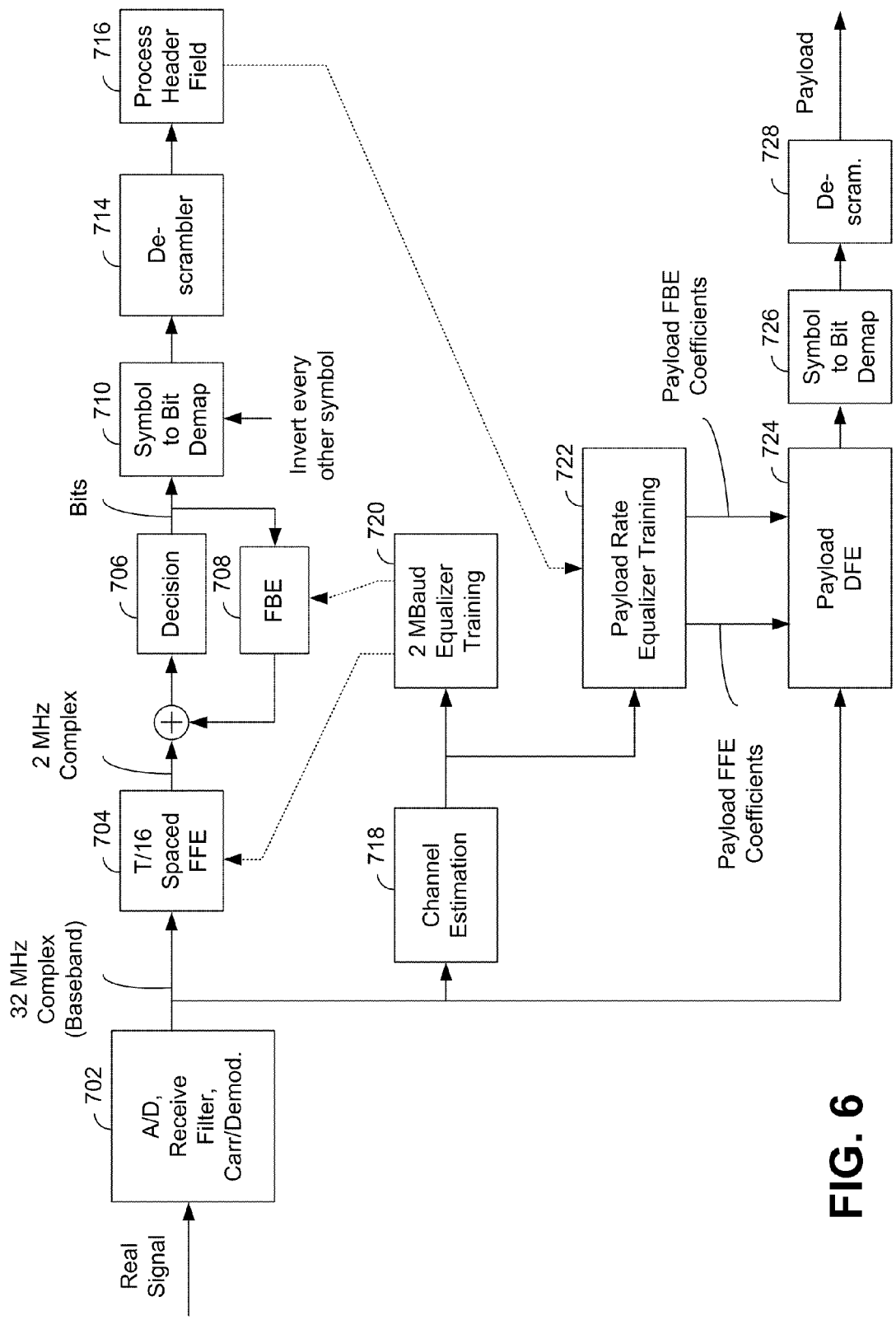
FIG. 6 is a block diagram illustrating components of a new version receiver section constructed according to the present invention.

FIG. 6 is a block diagram illustrating components of a new version receiver section constructed according to the present invention. The components of FIG. 6 may be contained in a home networking device such as the new version computers 106 and 110 of FIG. 1. The components of FIG. 6 may be implemented in dedicated hardware contained on an integrated circuit. Alternately, the components illustrated in FIG. 6 may be implemented within a digital signal processor contained in a device that supports home networking operations. Moreover, the components of FIG. 6 may be implemented as a combination of dedicated hardware components and a digital signal processor. Further, the components of FIG. 6 may be partially implemented in a host processor or other type of processor contained on a serviced device. Thus, the components of FIG. 6 are illustrated only to describe how the present invention may be functionally implemented in a new version device. As should be understood, these components may be employed in a home networking environment or in another networking environment in which interoperability between versions is performed.

In the receiver of FIG. 6, a real signal is received that is coupled to the device on a media such as the premises UTP wiring 112 of FIG. 1. This real signal may be amplified or attenuated prior to its receipt by an analog to digital converter, receiver filter, and carrier demodulation block 602. As is generally known, conversion from the analog domain to the digital domain is performed by an analog to digital converter (ADC) of block 602. Receive filtering and carrier demodulation from a carrier frequency, e.g., 12 MHz to baseband is also performed by block 602. In the particular embodiment of FIG. 6, ADC sampling is performed such that a 32 MHz complex baseband modulated signal is produced. This 32 MHz bandwidth is sufficient to sample the 4-21 MHz band of the Mask 2 device of Table 1. Thus, for a 2 MBaud preamble, header, and header, the 32 MHz sampling rate corresponds to a T/16 fractional sampling ratio.

The receiver structure of FIG. 6 includes a first signal path for 2 MBaud symbol rates and another signal path for other symbol rates. Referring again to Table 1, the preamble, header, and trailer portions of both the new version signal and the old version signal have a 2 MBaud symbol rate. Thus, the 2 MBaud signal path processes the preamble, header, and trailer of each data frame. Further, the 2 MBaud signal path processes payloads that have a 2 MBaud symbol rate, e.g., old version signals received by a new version device.

For all operations, the output of the ADC, receive filter, and carrier demodulation block 602 is received by a channel estimation block 618. The channel estimation block 618 produces a channel estimate based upon a preamble contained in a data frame of the received signal. This channel estimate is used by a 2 MBaud equalizer training block 620 to produce coefficients for a feed forward equalizer (FFE) 604 and a feedback equalizer (FBE) 608 of the 2 MBaud signal path. Together, the FFE 604 and the FBE 608 make up a Decision Feed Back Equalizer (DFE) that services the 2 MBaud signal path. The channel estimate is also used by a payload rate equalizer-training block 622 to produce payload FFE coefficients and payload FBE coefficients for use by a payload DFE 6724 (that include an FFE and a FBE).

With the FFE and FBE coefficients determined, the FFE 604 operates on the header of the data frame. The FFE 604 is a T/16 Spaced FFE that equalizes and optimally combines a plurality of spectral copies of a baseband modulated signal present within the bandwidth of the receive filter of block 602 (4-21 MHz). The output of the FFE 604 is received by summing block, which also receives the output of the FBE 608. The output of the summing block is received by decision block 606, which maps the baseband symbol to a corresponding constellation point. The output of decision block 606 is received by a symbol-to-bit demapper 610 that receives the constellation mapping output of decision block 606 and converts the constellation mapping to data bits. The output of the symbol-to-bit demapper 610 is received by descrambler 614, which performs descrambling operations. The output of the descrambler 614 is received by the process header field block 616 that determines at what baud rate and constellation size the payload portion of the corresponding data frame will be contained. This information is passed to the payload rate equalizer training block 622 and to a payload DFE 624.

Based upon the payload information extracted from the header, the payload rate equalizer training block 622 produces the payload FFE and the payload FBE coefficients that are employed by the payload DFE 624 to map symbols of the payload to constellation points. A payload symbol-to-bit demapper 626 receives the output of the payload DFE 624 and produces a scrambled bit stream. A payload descrambler 628 receives the output of the payload symbol-to-bit demapper 626 and produces the payload for the data frame.

According to the present invention, the symbol-to-bit demapper 610 inverts every other symbol of the received 2 MBaud baseband modulated signal to compensate for the 1 MHz frequency shift present in the signal. Further, for a payload transmitted by an old version device and received by the new version device of FIG. 6 (or for a frequency shifted payload at 2 MBaud transmitted by a new version device), such symbol inversion is also required.

Figure 7:
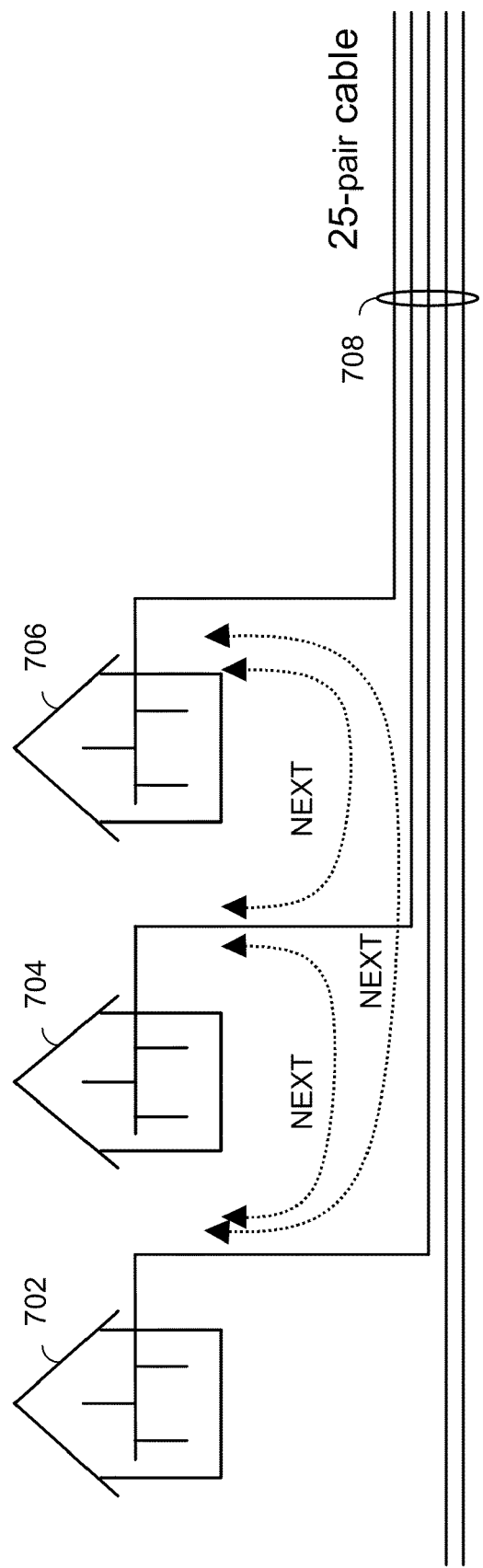
FIG. 7 is a block diagram illustrating the manner in which a plurality of HomePNA networks interconnects with the PSTN.
Figure 8:
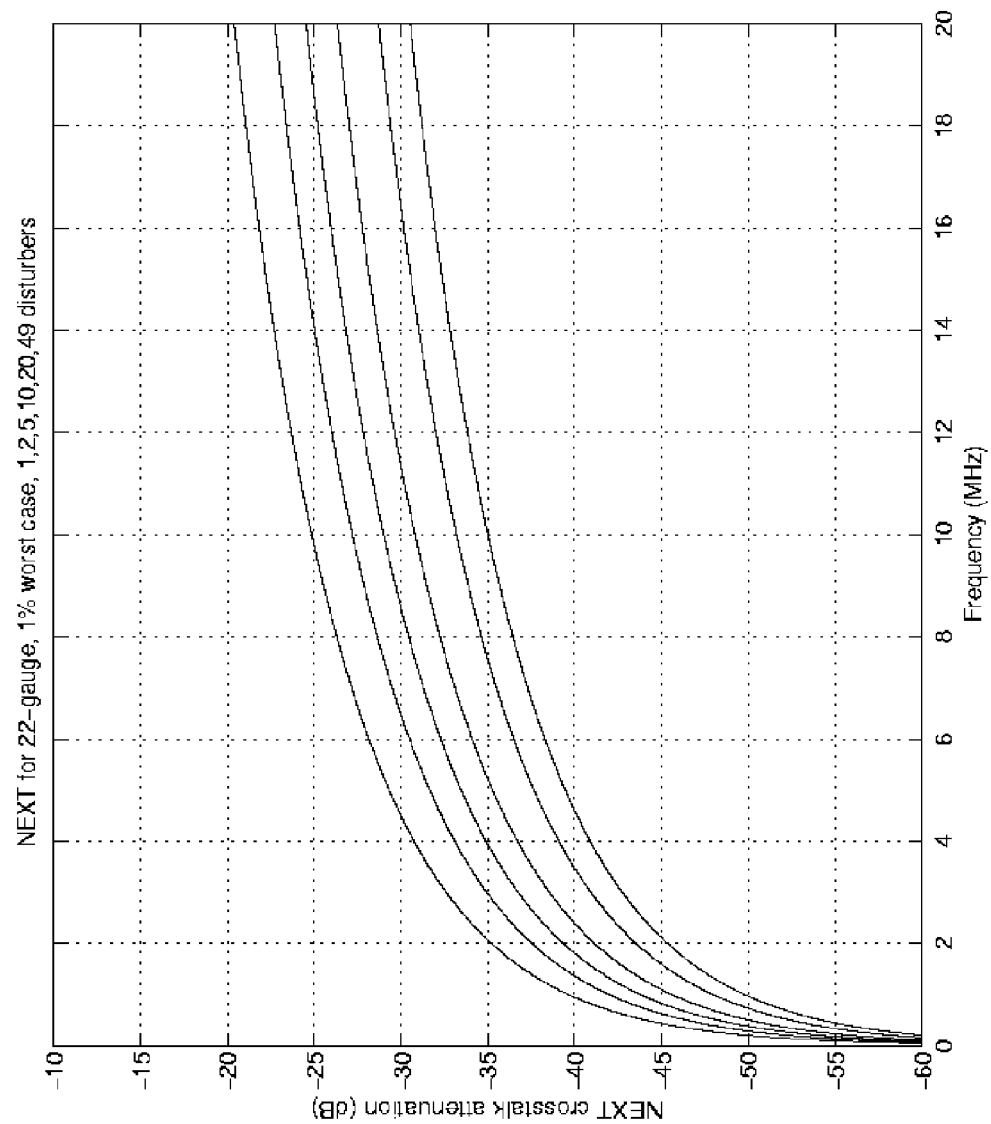
FIG. 8 is a graph illustrating the magnitude of HomePNA Near End Cross Talk versus frequency.

FIG. 7 is a block diagram illustrating the manner in which a plurality of HomePNA networks interconnects with the PSTN. As shown, each of homes 702, 704, and 706 includes a HomePNA network. Each of these HomePNA networks shares premises wiring with POTS devices and couples to the PSTN infrastructure. With these systems, Near End Crosstalk (NEXT) Energy from non-isolated HomePNA networks escapes into other non-isolated HomePNA networks sharing a cable binder 708. Such NEXT Energy Creates a time-varying colored noise floor. If receivers within the HomePNA networks are too sensitive, potential privacy issues are created since the receivers can receive transmissions from other non-isolated HomePNA transmitters. The severity of this problem is independent of the HPNA transmit power level. FIG. 8 is a graph illustrating the magnitude of HomePNA average Near End Crosstalk (NEXT) versus frequency. As shown, the cross-talk gain, $G_n$ may be expressed as:

$$G_n = \chi \frac{f^2}{\alpha(f)} \left(\frac{m}{49}\right)^{6/10}$$

where:
m is the number of interferers
f is the frequency
x is a scaling constant
a is the attenuation factor for the wire As illustrated, NEXT increases with frequency by 15 dB per decade. As can be deduced from the equation, the difference between 49 interferers and 5 interferers (1% worst case) is about 6 dB. Further, the difference between 49 interferers and 1 interferer (1% worst case) is about 10 dB (see J. J Werner, The HDSL Environment, IEEE Journal on Selected Areas in Communication, Vol. 9, No 6, August 1991). The curves of FIG. 8 reflect average cross-talk curves for a plurality of lines within a common media or binder for the above described cross-talk function.

Figure 9:
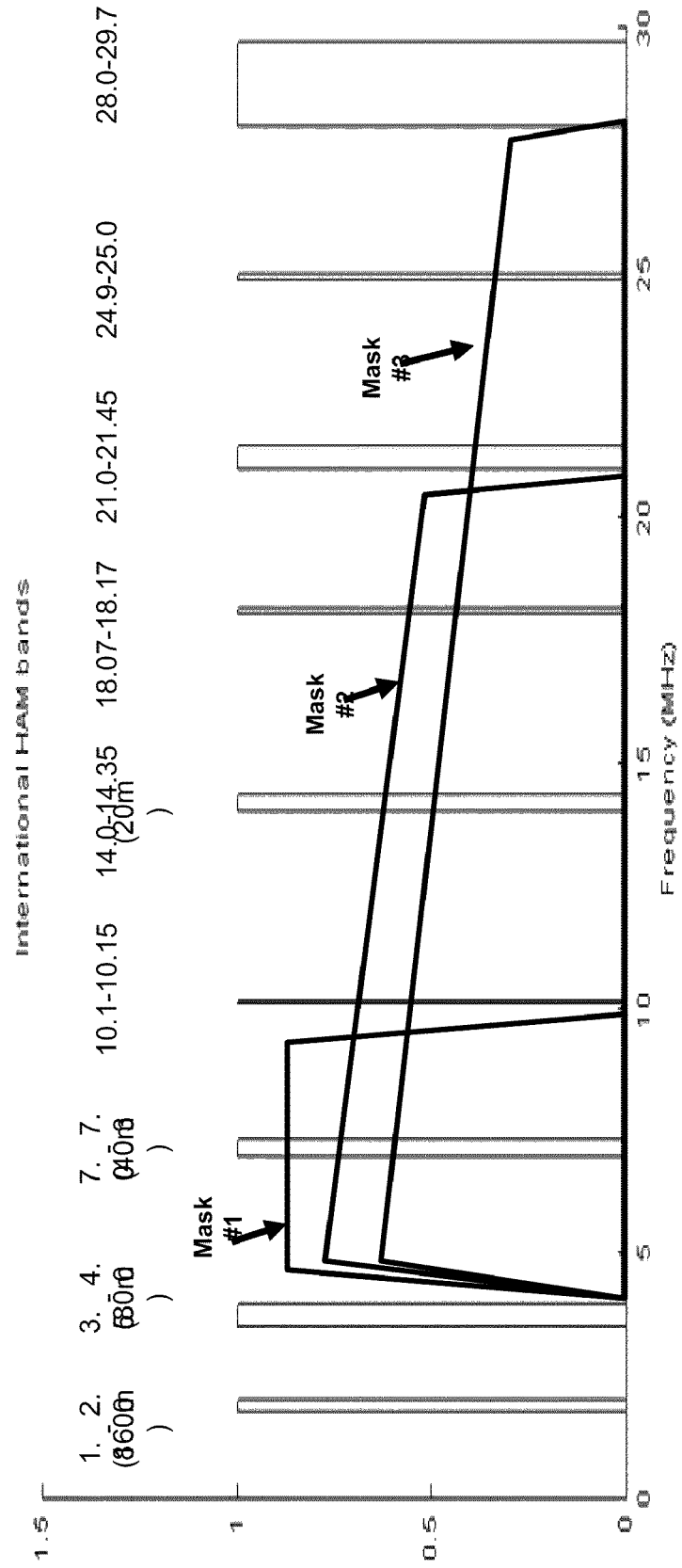
FIG. 9 is a graph illustrating transmit power spectral densities of transmitted signals within the frequency bands of FIG. 2 according to one aspect of the present invention.

FIG. 9 is a graph illustrating transmit power spectral densities (PSDs) of transmitted signals within the frequency bands of FIG. 2 according to one aspect of the present invention. To keep the same total power over a wider spectrum, the PSD must be lower on average. In order to be compatible with old version devices, however, there must be sufficient power in the 4-10 MHz band for robust old version device carrier-sensing. A flat new version signal PSD would not address this requirement for those embodiments in which a total power level is to remain constant for old and new version devices. In order to meet this goal, a sloping PSD concentrates power in the 4-10 MHz band and is achievable with low-order filters. In particular, the PSD of the new version signal is constructed to have a PSD that slopes downward at 15 dB/decade. The transmitted power in the 4-10 MHz band is within 2 dB of an old version signal at a peak value in the described embodiment of the invention. It is understood, of course, that the peak value may vary and may be equal to or even exceed a peak value of an old version signal. Because old version signals typically utilize a substantially flat PSD curve while the new version signals utilize a sloping PSD curve, it is possible, in an alternate embodiment of the invention, to have a peak value that exceeds a peak value for an old version signal without exceeding total power level restrictions. While there is a slight penalty in insertion loss tolerance between old version devices and new version devices, such result is unavoidable without increasing the total power. In a strictly self-cross-talk limited environment, the PSD shape does not affect capacity. However, in a self-cross-talk+white noise environment, the −15 dB/decade mask has advantages over other spectral shapes primarily because it has a magnitude that is an inverse of average cross-talk coupling thereby creating a reasonably constant white noise floor.

Figure 10:
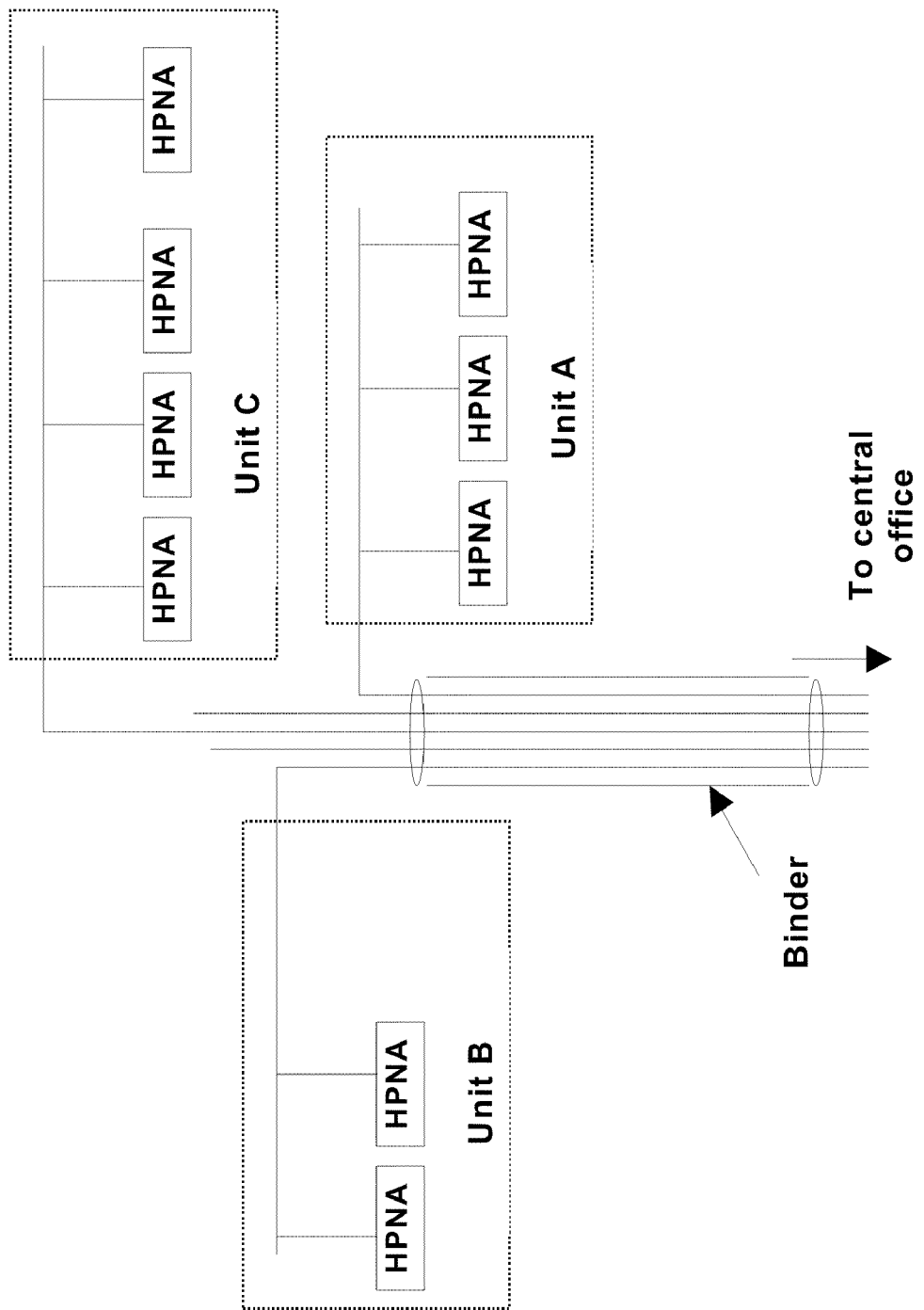
FIG. 10 is a block diagram illustrating a Multiple Dwelling Unit (MDU) HomePNA installation.

FIG. 10 is a block diagram illustrating a Multiple Dwelling Unit (MDU) HomePNA installation. HomePNA 2.0 was designed primarily for networking within a residence. It was not intended for distribution throughout a MDU environment from a centralized access point, although there is great interest in using HomePNA for this application. Furthermore, basic functionality with a single unit of an MDU could be compromised by cross-talk, which may be more severe than in single-family residences due to poorly controlled, poorly characterized wiring within a building. In this case, HomePNA is used only for networking within a unit. Connectivity to the outside world is provided by another service, such as DSL, voiceband modem, cable modem, or satellite. Depending on the quality of the binder, performance of the individual unit's networks may be impaired by cross-talk from other units. This may raise the noise floor causing reduced data rates, and, in extreme cases, it may render the networks inoperable. This type of cross-talk is referred to herein as Near-Near cross-talk (NNXT), indicating that near-end cross-talk signals are interfering with reception of another near-end signal.

Figure 11:
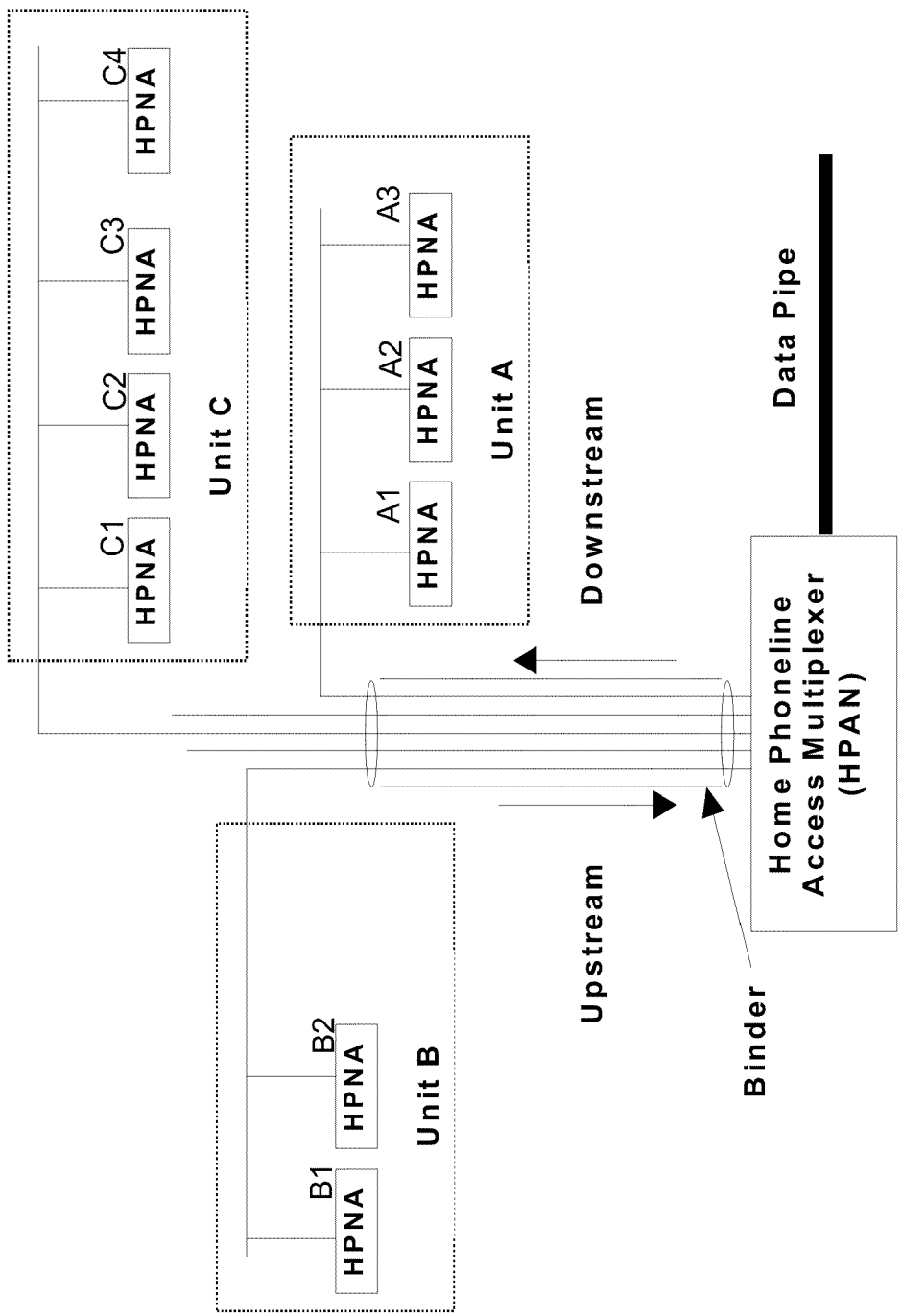
FIG. 11 is a functional block diagram that illustrates the operation of a Home Phoneline Access Multiplexer (HPAN) according to one embodiment of the present invention.

FIG. 11 is a block diagram illustrating a MDU HomePNA installation according to the present invention. FIG. 11 illustrates a typical MDU with HomePNA used for distribution. With existing HomePNA 2.0 technology, this configuration does not work well unless the binder is very short. For longer binders, a type of Near End Cross talk (NEXT) referenced herein as Near-Far cross-talk can reduce or eliminate throughput. Near-Far cross-talk refers to near-end cross-talk signals interfering with reception of a far-end signal (transmitted at a far-end). For example, if the HPAN is simultaneously transmitting and receiving data on different lines in the binder to a far-end HomePNA station as well as from a far-end HomePNA station, the strong near-end transmitted signals (transmitted by the HPAN) interfere with the weak received signals transmitted at the far-end, especially when the far-end signal has been attenuated by transmission over a long distance.

Another type of cross-talk is Far-End cross-talk (FEXT). This type of cross-talk occurs when a far-end cross-talk signal interferes with reception of a far-end transmitted signal. This is referenced herein also as Far-Far cross-talk. Far-Far cross-talk is less severe than Near-Far cross-talk because the cross-talk signals have also been attenuated by the binder and were approximately of similar magnitude at the location of the cross-talk interference. A third type of cross-talk is Near-Near cross-talk wherein a near HomePNA station's transmissions interfere with another near HomePNA station's transmissions.

A HomePNA system constructed according to the present invention operates to mitigate the affects of Near-Near, Near-Far and/or Far-Far cross-talk. According to a first operation, the HPAN synchronizes upstream and downstream transmissions. Downstream refers to packets sent by the HPAN to stations within the dwelling units. Upstream refers to packets sent by stations within the dwelling units, regardless of the destination. The Master nodes of each HomePNA network, i.e., one of the HomePNA nodes in each HomePNA network, synchronizes the upstream and downstream transmissions of all HomePNA stations in the respective HomePNA network to eliminate Near-Far cross-talk but not Near-Near cross-talk. Hence, this benefits MDU distribution, but not basic MDU functionality.

According to a second operation of the present invention, the HPAN manages the transmission power of the HomePNA stations of the HomePNA networks. To optimize throughput across the whole building, HomePNA station transmission power levels are adjusted based on their location. For example, a HomePNA station close to the binder, which causes a lot of cross-talk, would reduce its power relative to a station far from the binder. (Here, the word "close" and "far" indicate the amount of signal attenuation which is related to but not necessarily the actual distance). The HPAN can collect statistics about the signal strength from all HPNA stations, and based on this information, it can make decisions about the best transmit power levels for the HomePNA stations on a per unit basis (per HomePNA network). The Master nodes of the HomePNA networks then instruct the slave nodes in their respective HomePNA networks to adjust their power accordingly. This mitigates Far-Far and Near-Near cross-talk. This benefits both MDU distribution and MDU basic functionality.

A third operation according to the present invention includes adjusting the receiver sensitivity of the HomePNA stations within a multiple dwelling unit and, as needed, within a unit (home network) of the multiple dwelling unit. The HPAN instructs individual HomePNA stations to adjust (e.g., decrease) their receiver sensitivity to prevent triggering on cross-talk, based on knowledge of cross-talk levels in the building and even within the individual units or home networks. This benefits MDU basic functionality.

One problem of HomePNA networks within a multiple dwelling unit, as shown here in FIG. 11, is the cross-talk that is experienced between the plurality of media within binder 1208. The table shown below corresponds with FIG. 11 and illustrates the types of cross-talk identified herein by the present inventor.

| Row | Receiver | Desired Transmitter | Cross-talk Transmitter | Cross-talk Type | Typical Severity | Mitigation Step |
|---|---|---|---|---|---|---|
| 1. | A1 | A2 | HPAN-B | FNXT | benign | None |
| 2. | A1 | A2 | B1 | NNXT | moderate | Adjust Power Reduce Sensitiv. |
| 3. | A1 | HPAN-A | HPAN-B | FFXT | moderate | Adjust Power |
| 4. | HPAN-A | A1 | B1 | FFXT | moderate | Adjust Power |
| 5. | A1 | HPAN-A | B1 | NFXT | severe | Synchronization |
| 6. | HPAN-A | A1 | HPAN-B | NFXT | severe | Synchronization |

Of the various types of cross-talk, some may be ignored while others are severe and require mitigation. More specifically, the HPAN eliminates Near-Far cross-talk (NFXT), which is often severe in its effects, as illustrated in Rows 5 and 6, by synchronizing downstream and upstream transmissions. Thus, none of the HPNA stations transmit upstream while the HPAN is transmitting downstream. As is described in greater detail below, the HPNA stations transmit only during specified or synchronized periods. "Near" and "Far" are terms used herein from the perspective of the receiver. Thus, if the HPAN is the receiver, as in Rows 4 and 6, all of the HPNA transmitters of the various units are "Far". Similarly, each of the HPNA unit stations are "Near" relative to each other while the HPAN is "Far". Thus, "NFXT" refers to a Near cross-talk transmitter in relation to a Far transmitter that is transmitting to the receiver as in the case of Rows 5 and 6.

Row 1 illustrates that a Far cross-talk transmitter may interfere with a Near transmitter, but the effects of such interference are substantially benign and do not require adjustment. Because, however, upstream and downstream communications are being synchronized to eliminate the NFXT, the interference identified in Row also is eliminated.

Row 2 illustrates NNXT (moderate interference) that results from a Near cross-talk transmitter interference with a Near transmitter of a communication signal. NNXT may be reduced by adjusting transmission power levels and by adjusting sensitivity of the receivers of the HPNA stations, both based on the distance from the binder. Rows 3 and 4 illustrate FFXT that result from a Far cross-talk transmitter interference with a Far transmitter of a communication signal. FFXT may be reduced by adjusting transmission power levels of the HPNA stations as shown in Rows 3 and 4 to match each other.

Figure 12:
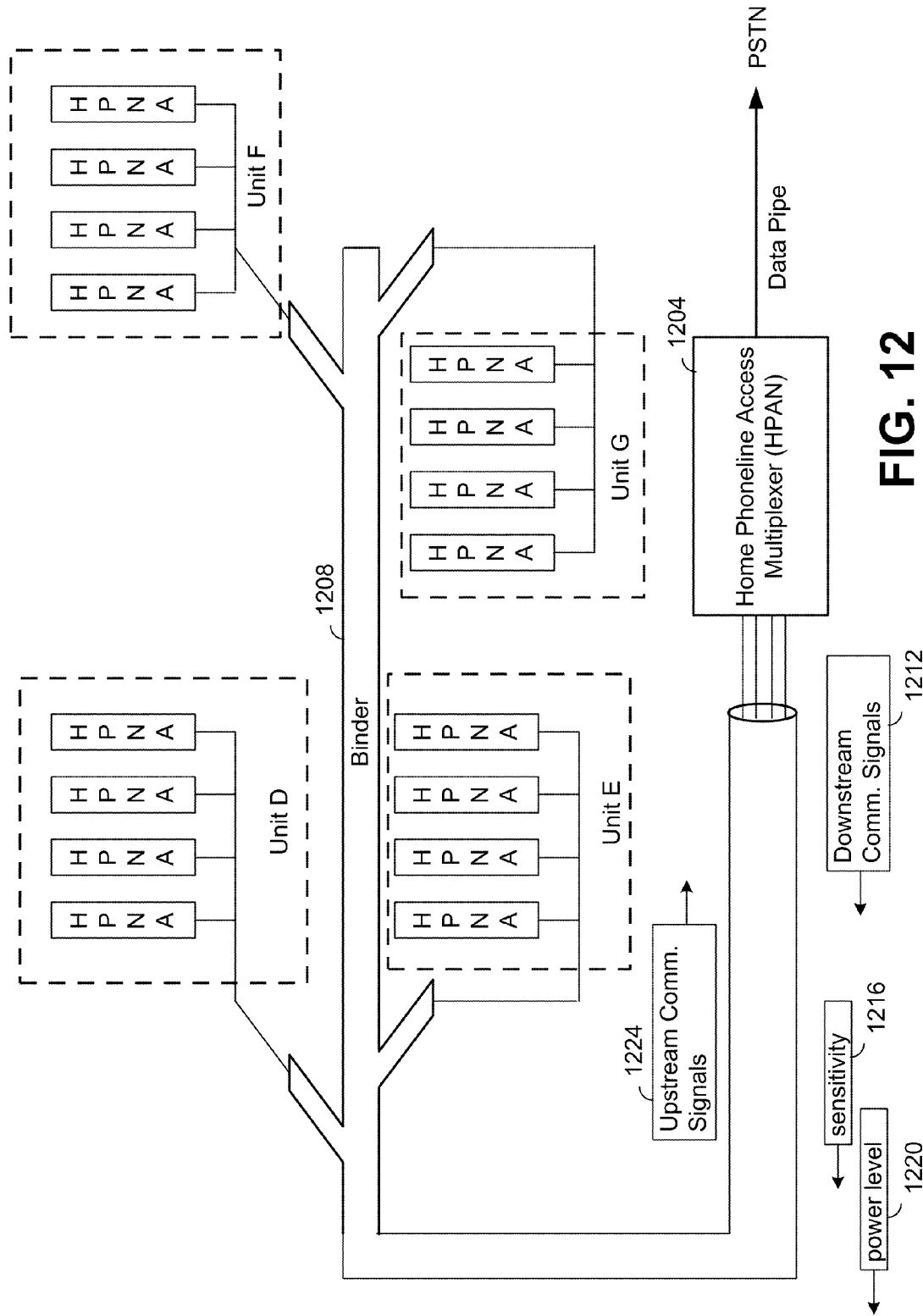
FIG. 12 is a block diagram illustrating a multiple dwelling unit HomePNA installation according to one embodiment of the present invention.

FIG. 12 is a block diagram illustrating a multiple dwelling unit HomePNA installation according to one embodiment of the present invention. As may be seen, a Home Phoneline Access Multiplexer (HPAN) 1204 is coupled to an external network, for example, a public switched telephone network, by way of a data pipe. As may also be seen, HPAN 1204 is coupled to connect with a plurality of HomePNA stations in a plurality of units within a multiple dwelling unit. As may further be seen, a binder 1208 is used to encase a plurality of communications media wherein there is assigned one communications media per unit of the multiple dwelling unit. Each unit of the multiple dwelling unit (MDU) comprises at least one HPNA station, although the present example illustrates four HPNA stations per unit.

As may be seen, HPAN 1204 generates downstream communication signals 1212, as well as sensitivity signals 1216 and power level signals 1220, that are transmitted over the plurality of media through binder 1208 to the intended units and the HomePNA stations there within. The HPAN 1204 further receives upstream communication signals 1224 that are generated by the individual HomePNA stations of the units D, E, F and G.

Generally, HPAN 1204 generates power level signals to the HomePNA stations with each of the units to cause the received power levels at the HPAN 1204 for the various HomePNA stations to approximately match each other, although other criteria may be used. By controlling the transmission power levels on a per unit basis, Near-Near and Far-Far cross-talk is reduced. HPAN 1204 also generates sensitivity control signals 1216 to each of the HomePNA stations according to detected levels of cross-talk within the particular units that correspond to the particular HomePNA stations. Thus, by setting a corresponding sensitivity level for the HomePNA stations within a particular unit, a sensitivity level that is adjusted according to detected levels of cross-talk maximizes the ability that a HomePNA station has to properly receive and process a signal from another HomePNA station within the same unit or from downstream transmissions from HPAN 1204.

Figure 13:
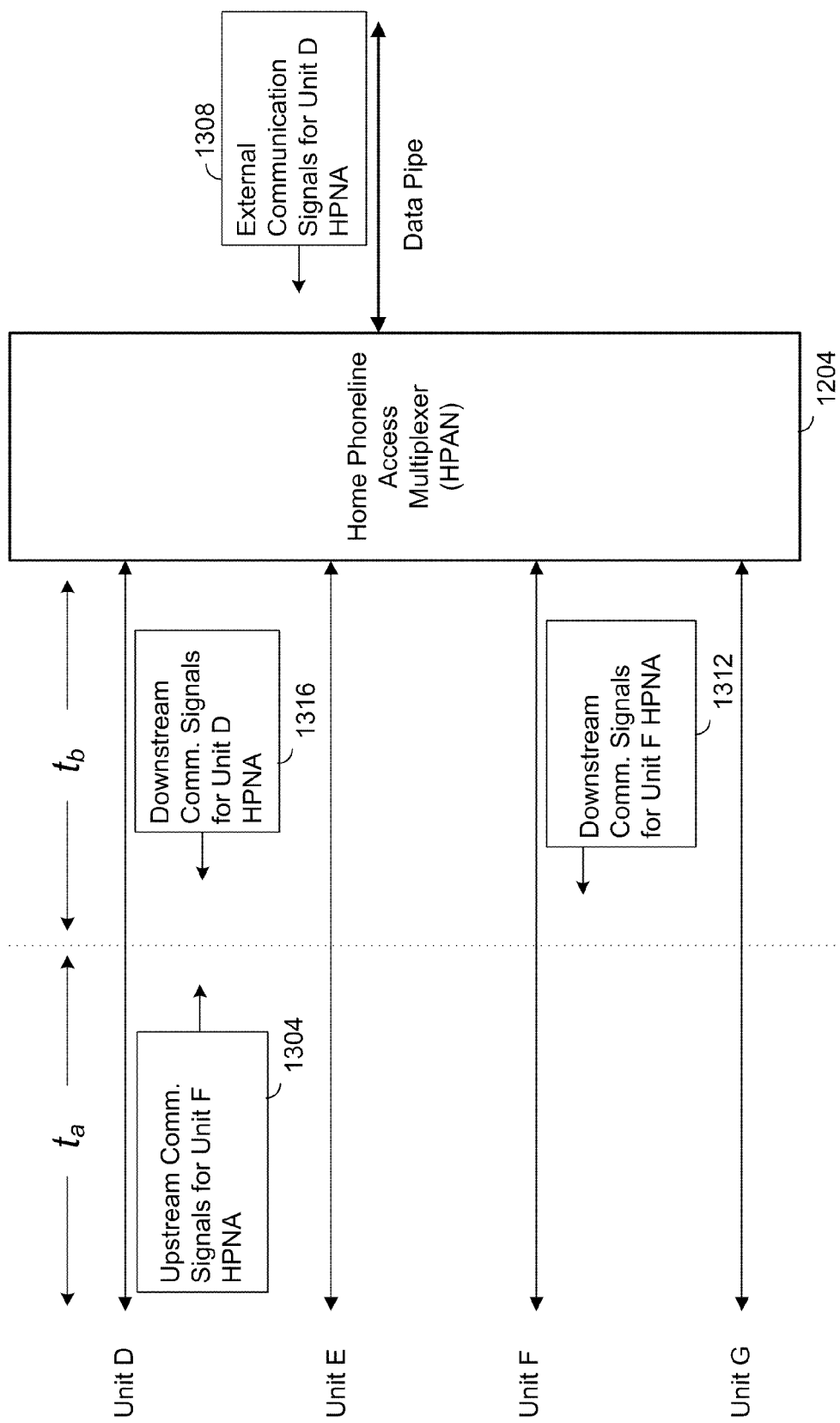
FIG. 13 is a functional block diagram that illustrates the operation of a Home Phoneline Access Multiplexer (HPAN) according to one embodiment of the present invention.

FIG. 13 is a functional block diagram that illustrates the operation of a Home Phoneline Access Multiplexer (HPAN) according to one embodiment of the present invention. In the example of FIG. 13, an HPAN, for example, HPAN 1204 of FIG. 12, receives upstream communications on any one of a plurality of media that are routed through a common binder, as well as external communication signals for the particular HomePNA stations received by way of a data pipe that is coupled to an external network such as the public switched telephone network. More specifically, as is shown in FIG. 13, HPAN 1204 receives upstream communication signals 1304 that are intended for a unit F HomePNA station.

HPAN 1204, as may be seen, receives the upstream communication signals 1304 from an HPAN within unit D. As may also be seen, HPAN 1204 receives external communication signals for a HomePNA within unit D in communication signal 1308. The HPAN 1204 temporarily stores communication signals 1304 and 1308 and then subsequently transmits downstream communication signals for the corresponding HomePNA units. More specifically, upstream communication signals 1304 are transmitted to unit F as downstream communication signals 1312, while the externally received communication signals 1308 are transmitted as downstream communication signals 1316 to a HomePNA station within unit D. In the prior art, the HPAN transmits only if the media is clear and no HomePNA station is transmitting thereon. Such simplistic logic, however, does not avoid the interference that is created by cross-talk.

As has been described before, however, communication signals 1304 may readily interfere with other upstream or downstream communication signals as a result of cross-talk within a common binder. Accordingly, as is suggested within FIG. 13, all upstream communications on the media within a common binder are synchronized to eliminate this kind of cross-talk (Near-Far cross-talk). Thus, upstream communications, such as communication signals 1304, are transmitted during a first period $t_a$, while downstream communication signals, such as downstream communication signals 1312 and 1316, are transmitted during a different period $t_b$.

Figure 14:
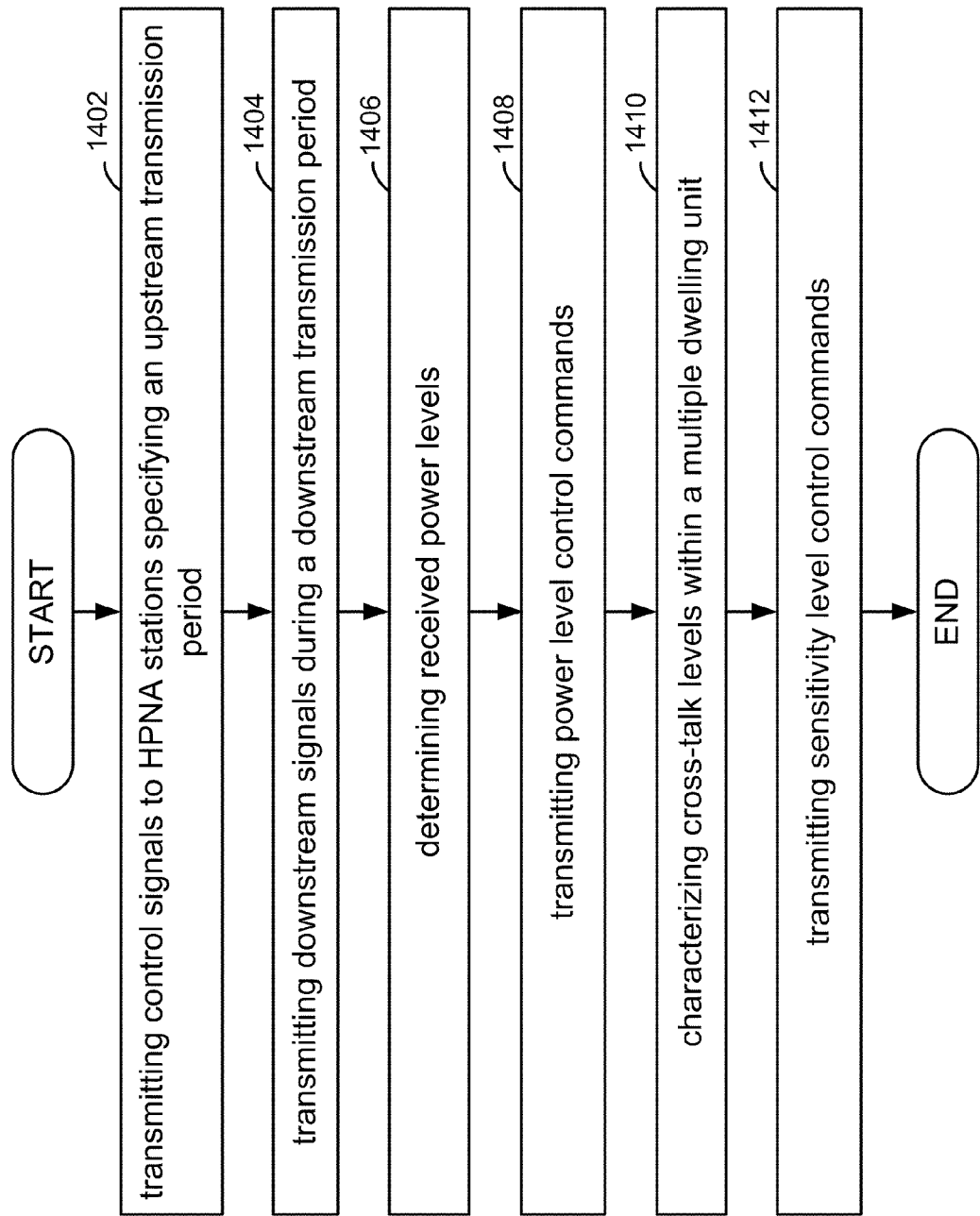
FIG. 14 is a flowchart that illustrates one embodiment of the present invention.

FIG. 14 is a flowchart that illustrates one embodiment of the present invention. Initially, an HPAN transmits control signals to HomePNA stations specifying an upstream transmission period (step 1402). In one embodiment of the invention, only one upstream transmission period is defined. In an alternate embodiment of the invention, however, a plurality of upstream transmission periods are defined. Thereafter, the HPAN transmits downstream signals during a downstream transmission period (step 1404). While the HPAN does not inform, in one embodiment, any of the devices within the home networking network of the downstream transmission period, it adheres to a specified downstream transmission period itself for all transmissions that it originates. In an alternate embodiment, the HPAN does inform the devices of the home networking network of the assigned time period for downstream communications as well as for upstream communications.

The invention further includes determining the received power levels for transmissions from the HomePNA agents' transmissions (step 1406). After determining the received power levels for the HomePNA agents' transmissions, the HPAN evaluates which HomePNA agents (or units of HomePNA agents) need to modify their transition power levels so that the received power levels from the plurality of HomePNA agents are approximately equal. Accordingly, the HPAN then transmits power level control commands to one or more HomePNA agents responsive to determining what power transmission level adjustments need to be made (step 1408). The invention further includes the HPAN characterizing cross-talk levels within a multiple dwelling unit (step 1412). Based on the characterized cross-talk levels within a multiple dwelling unit, the HPAN transmits sensitivity level control commands to optimize sensitivity levels of the various receivers of the HomePNA agents according to the characterized cross-talk levels within the multiple dwelling unit (step 1414).

As may be seen, the invention generally includes synchronizing upstream and downstream communications, adjusting transmission power levels of one or more HomePNA agents so that received power levels and cross-talk at a near end is reduced, as well as generating sensitivity level control commands for the receivers of the HomePNA agents to optimize the sensitivity levels based on determined cross-talk levels within the multiple dwelling unit.

Figure 15:
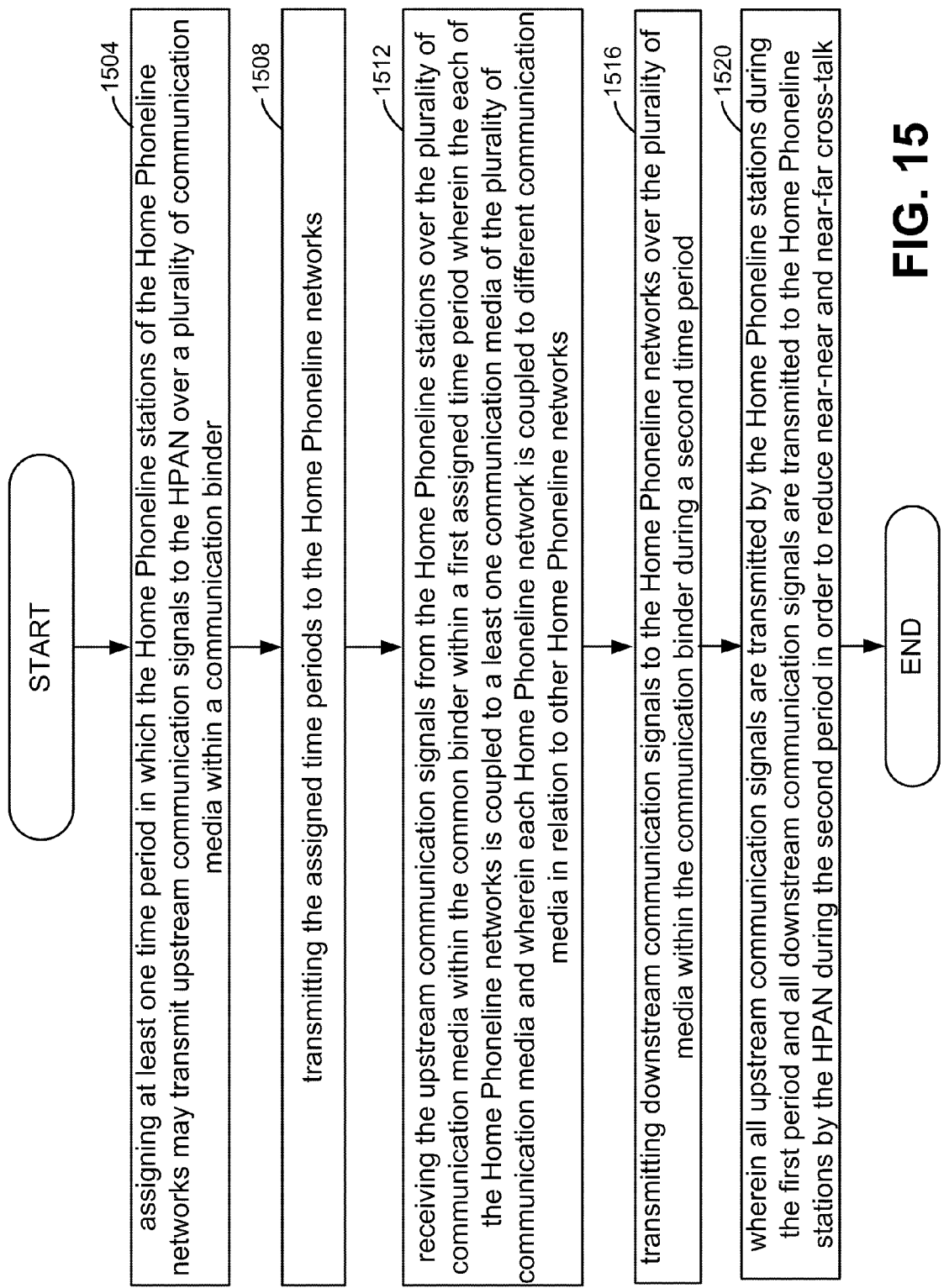
FIG. 15 is a flowchart that shows one method of reducing cross-talk according to an embodiment of the present invention.

FIG. 15 is a flowchart that shows one method of reducing cross-talk according to an embodiment of the present invention. Initially, an HPAN assigns at least one time period in which HomePNA agents of the Home Phoneline networks may transmit upstream communication signals to the HPAN over a plurality of communication media within a communication binder (step 1504). In one embodiment of the invention, a single period is defined for all upstream communications. In an alternative embodiment of the invention, a plurality of upstream communication periods are defined wherein one period is assigned for each unit (home networking network having one or more HomePNA stations). Accordingly, the invention further includes the HPAN transmitting the assigned time periods to the Home Phoneline networks and, more particularly, to the HomePNA agents of the Home Phoneline networks (step 1506). Thereafter, the HomePNA agent receives upstream communication signals from the HomePNA agents over the plurality of communication media within the common binder within a first assigned time period wherein each of the Home Phoneline networks is coupled to at least one communication media of the plurality of communication media and wherein each Home Phoneline network is coupled to different communication media in relation to other Home Phoneline networks (step 1508). This step, as described, is for the embodiment in which only one upstream communication period is assigned. If a plurality of upstream periods are assigned, this step includes receiving the communication signals during a first group of periods. The HPAN further transmits downstream communication signals to the Home Phoneline networks over the plurality of media within the communication binder during a second time period (step 1514) (or second group of periods for the alternate embodiment). As may be seen, therefore, the upstream communication signals are transmitted during a different period in relation to the downstream communication signals. Thus, the invention includes all upstream communication signals being transmitted by the HomePNA agents during the first period (or group of periods) and all downstream communication signals being transmitted to the HomePNA agents by the HPAN during the second period (or group of periods) in order to reduce Near-Far cross-talk. With respect to the HPAN, this step involves merely receiving upstream communication signals during the first period and transmitting communication signals during the second period.

By coordinating the upstream and downstream communications over the different media, wherein one media is assigned to each HomePNA network or unit in relation to downstream communications, Near-Far cross-talk is either eliminated or reduced.

In the alternate embodiment of the invention, each unit or HomePNA network is allocated a slot within the first time period for transmitting upstream communication signals, thereby reducing the likelihood that even upstream communication signals interfere with each other with cross-talk interference. Thus, in the network of FIG. 12 or FIG. 13, four time slots within the first period are assigned for upstream communications, and four time slots within the second period are assigned for downstream communications. The technique of assigning time slots may be used to solve Near-Near cross-talk as well.

The necessity to assign time slots for downstream communications, however, is not as great, as the HPAN may regulate itself and will only generate downstream communications to one HomePNA network or HomePNA agent at a time. Accordingly, the types of upstream cross-talk interferences that may be realized are not as likely for the downstream communications if there are no simultaneous upstream communications occurring. The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A Home Phoneline Access Multiplexer (HPAN) that services a plurality of groups of Home Phoneline stations, comprising:

means for receiving a first communication signal over a first media from a first Home Phoneline station;

means for receiving a second communication signal over a second media from a second Home Phoneline station wherein the first and second media are routed in a common binder;

means for assigning a first time period for the first and second Home Phoneline stations to transmit downstream communication signals;

means for transmitting the assigned first time period to the first and second Home Phoneline stations in order to reduce cross-talk;

means for transmitting upstream communication signals over the first and second media during a second time period;

means for measuring a signal strength of at least one transmission received by the HPAN from at least one of the first and second Home Phoneline stations;

means for determining a transmit power setting for at least one group of the plurality of groups of Home Phoneline stations based upon at least one measured signal strength; and means for transmitting the determined transmit power setting to at least one of the first and second Home Phoneline stations.

2. The HPAN of claim 1 wherein the Home Phoneline stations are part of a Home Phoneline network that includes phones and communication devices that are all located within one structure.

3. The HPAN of claim 1 further including means for determining a received power level for at least one Home Phoneline station of a Home Phoneline network.

4. The HPAN of claim 1 wherein the means for determining a transmission power level determines a transmission power level to reduce Near-Far cross-talk by lowering the transmission power level of a near Home Phoneline station of a near Home Phoneline network to substantially match a received power level of a far Home Phoneline station.

5. The HPAN of claim 4 further including means for determining a receiver sensitivity level based upon the determined relative cross-talk interference level within a Home Phoneline network and transmitting the determined receiver sensitivity level to each Home Phoneline network to reduce any one of Near-Near, Near-Far and Far-Far cross-talk.

6. A Home Phoneline Access Multiplexer (HPAN) that services a plurality of groups of Home Phoneline stations, comprising:

logic for controlling communications of the plurality of groups of Home Phoneline stations for reducing cross-talk in a Multiple Dwelling Unit (MDU) Home Phoneline Networking System that includes the Home Phoneline Access Multiplexer (HPAN);

communication circuitry for receiving transmissions of the Home Phoneline stations and for transmitting communications to the Home Phoneline stations;

wherein:

the HPAN measures a signal strength of at least one transmission received by the HPAN from a Home Phoneline station from one of the plurality of groups of Home Phoneline stations;

determines a transmit power setting for at least one group of the plurality of groups of Home Phoneline stations based upon at least one measured signal strength; and transmits the determined transmit power setting to at least one Home Phoneline station of the at least one of the plurality of groups of Home Phoneline stations in order to reduce cross-talk.

7. The HPAN of claim 6 wherein the HPAN determines to reduce a transmission power level of a near group of Home Phoneline stations to cause the measured signal strength of at least one near Home Phoneline station to match a measured signal strength of a farther Home Phoneline station transmitting on a different media.

8. The HPAN of claim 6 wherein the HPAN determines a relative cross-talk interference level for the at least one group of the plurality of groups of Home Phoneline stations.

9. The HPAN of claim 8 wherein the HPAN determines a receiver sensitivity level based upon the determined relative cross-talk interference level within the at least one group of the plurality of groups of Home Phoneline stations and transmits the determined receiver sensitivity level to at least one Home Phoneline station of the at least one group of the plurality of groups of Home Phoneline stations.

10. The HPAN of claim 6 wherein the HPAN determines to increase a transmission power level of a far group of Home Phoneline stations to cause a measured signal strength of at least one near Home Phoneline station transmission to match a measured signal strength of a farther Home Phoneline station transmission transmitting on a different media.

11. The HPAN of claim 6 wherein the HPAN determines a cross-talk interference level and a receiver sensitivity level based upon the determined cross-talk interference level within the at least one group of the plurality of groups of Home Phoneline stations and transmits the determined receiver sensitivity level to at least one Home Phoneline station of the at least one group of the plurality of groups of Home Phoneline stations.

12. The HPAN of claim 6 wherein the HPAN determines to assign a first time slot to a first group of the plurality of groups of Home Phoneline stations and transmits the assigned first time slot to at least one Home Phoneline station of the first group of Home Phoneline stations.

13. The HPAN of claim 6 wherein the HPAN determines to assign a second time slot to a second group of the plurality of groups of Home Phoneline stations and transmits the assigned second time slot to at least one Home Phoneline station of the second group of Home Phoneline stations to reduce cross-talk between Home Phoneline stations between the first and second groups of Home Phoneline stations.

14. A method for reducing cross-talk in a Multiple Dwelling Unit (MDU) Home Phoneline Networking System that includes a Home Phoneline Access Multiplexer (HPAN) that services a plurality of groups of Home Phoneline stations, the method comprising:

receiving a first communication signal over a first media from a first Home Phoneline station;

receiving a second communication signal over a second media from a second Home Phoneline station wherein the first and second media are routed in a common binder;

assigning a first time period for the first and second Home Phoneline stations to transmit downstream communication signals;

transmitting the assigned first time period to the first and second Home Phoneline stations in order to reduce cross-talk;

transmitting upstream communication signals over the first and second media during a second time period; and determining transmit power settings for at least one Home Phoneline station of the pluralities of groups of Home Phoneline stations and transmitting the determined transmit power settings to the at least one Home Phoneline station.

15. The method of claim 14 wherein the determine transmit power settings are determined so that the received signal strengths of transmissions of the Home Phoneline stations the plurality of groups of Home Phoneline stations are approximately equal.

16. The method of claim 15 further comprising determining a receiver sensitivity level for at least one of the first and second Home Phoneline stations based upon a determined relative cross-talk interference level within a corresponding group of Home Phoneline stations and transmitting the determined receiver sensitivity level to at least one of the first and second Home Phoneline stations to prompt at least one of the first and second Home Phoneline stations to change its receiver sensitivity to a corresponding level.

17. The method of claim 14 further including determining and assigning downstream transmission times for a plurality of Home Phoneline stations communicating over different physical media.

18. The method of claim 17 wherein the first and second Home Phoneline stations are from different groups of Home Phoneline stations and wherein the first and second Home Phoneline stations are assigned a common transmission time so that they transmit downstream communications approximately at the same time.

19. The method of claim 17 wherein the first and second Home Phoneline stations are from different groups of Home Phoneline stations and wherein the first and second Home Phoneline stations are assigned a different transmission time to reduce at least one of crosstalk and interference even though the first and second Home Phoneline stations are from different groups and communicate over different media.

* * * * *